(12) United States Patent
Lewbel

(10) Patent No.: US 10,796,086 B2
(45) Date of Patent: Oct. 6, 2020

(54) SELECTIVELY CONTROLLING MODIFICATION STATES FOR USER-DEFINED SUBSETS OF OBJECTS WITHIN A DIGITAL DOCUMENT

(71) Applicant: MICROSOFT TECHNOLOGY LICENSING, LLC, Redmond, WA (US)

(72) Inventor: Hannah Rebecca Lewbel, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 66 days.

(21) Appl. No.: 16/112,688

(22) Filed: Aug. 25, 2018

(65) Prior Publication Data
US 2020/0065361 A1 Feb. 27, 2020

(51) Int. Cl.
| | | |
|---|---|---|
| *G06F 17/20* | (2006.01) | |
| *G06F 40/197* | (2020.01) | |
| *G06F 40/166* | (2020.01) | |
| *G06F 3/0485* | (2013.01) | |
| *G06F 3/0484* | (2013.01) | |
| *G06F 3/16* | (2006.01) | |

(52) U.S. Cl.
CPC .......... *G06F 40/197* (2020.01); *G06F 3/0485* (2013.01); *G06F 40/166* (2020.01); *G06F 3/04842* (2013.01); *G06F 3/167* (2013.01)

(58) Field of Classification Search
None
See application file for complete search history.

(56) References Cited

U.S. PATENT DOCUMENTS

| | | | | |
|---|---|---|---|---|
| 5,404,439 | A | * | 4/1995 | Moran ................ G06F 3/04842 345/642 |
| 5,481,710 | A | * | 1/1996 | Keane ..................... G06F 9/451 719/320 |
| 6,108,668 | A | * | 8/2000 | Bates ...................... G06F 17/24 |

(Continued)

OTHER PUBLICATIONS

Meng et al., Visualizing Histories for Selective Undo and Redo, Proceedings, 3rd Asia Pacific Computer Human Interaction (Year: 1998).*

(Continued)

*Primary Examiner* — Shahid K Khan
(74) *Attorney, Agent, or Firm* — Newport IP, LLC; Mike R. Cicero

(57) ABSTRACT

The disclosed technologies enable users to view a particular modification state of select objects of a document without impacting the display of unselected objects. For example, a user can create a number of objects located at different sections of a document. The user may perform modifications to each object that result in a sequence of modification states for each object. The user may select a subset of the objects by the use of an input gesture. The user can then view a specific modification state of the selected objects that existed at a first point in time, while viewing a modification state of other objects that existed at another point in time. In this way, the user is enabled to concurrently view different versions of each object even if these particular versions did not coexist at any point in time during the user's editing process.

20 Claims, 14 Drawing Sheets

(56) References Cited

U.S. PATENT DOCUMENTS

| | | | |
|---|---|---|---|
| 6,523,134 B2* | 2/2003 | Korenshtein | G06F 9/451 |
| | | | 714/16 |
| 8,533,593 B2 | 9/2013 | Grossman et al. | |
| 8,539,347 B2 | 9/2013 | Harrington | |
| 8,589,349 B2 | 11/2013 | Grant et al. | |
| 9,146,914 B1* | 9/2015 | Dhaundiyal | G06F 17/24 |
| 9,898,173 B2* | 2/2018 | Gilra | G06F 3/04842 |
| 10,007,352 B2* | 6/2018 | Poulos | G02B 27/0103 |
| 10,169,054 B2* | 1/2019 | Dhupar | G06F 9/451 |
| 2004/0169681 A1 | 9/2004 | Van kesteren et al. | |
| 2008/0109717 A1* | 5/2008 | Krauter | G06F 40/166 |
| | | | 715/255 |
| 2010/0241994 A1* | 9/2010 | Wiley | G06F 3/04842 |
| | | | 715/832 |
| 2011/0107246 A1* | 5/2011 | Vik | G06F 3/0481 |
| | | | 715/771 |
| 2011/0113326 A1* | 5/2011 | Baer | G06F 40/194 |
| | | | 715/255 |
| 2012/0005156 A1* | 1/2012 | Grant | G06F 16/1873 |
| | | | 707/608 |
| 2012/0047434 A1* | 2/2012 | Ginetti | G06F 40/166 |
| | | | 715/255 |
| 2012/0130741 A1 | 5/2012 | Sparandara et al. | |
| 2012/0185762 A1 | 7/2012 | Ozer et al. | |
| 2012/0271867 A1* | 10/2012 | Grossman | G06F 40/197 |
| | | | 707/821 |
| 2014/0123042 A1* | 5/2014 | Lee | G06F 3/04883 |
| | | | 715/765 |
| 2016/0378734 A1 | 12/2016 | Mullins et al. | |
| 2017/0185574 A1 | 6/2017 | Fern et al. | |

OTHER PUBLICATIONS

Meng et al., Visualizing Histories for Selective Undo and Redo, Proceedings, 3rd Asia Pacific Computer Human Interaction, Jul. 1998 (Year: 1998).*

Chen, et al., "Data-driven Adaptive History for Image Editing", In Proceedings of the 20th ACM SIGGRAPH Symposium on Interactive 3D Graphics and Games, Feb. 27, 2016, pp. 103-111.

Meng, et al., "Visualizing Histories for Selective Undo and Redo", In Proceedings of 3rd Asia Pacific Computer Human Interaction, Jul. 17, 1998, pp. 459-464.

"International Search Report and Written Opinion Issued in PCT Application No. PCT/US19/038836", dated Sep. 27, 2019, 17 Pages.

Seifried, et al., "Regional Undo/Redo Techniques for Large Interactive Surfaces", In Proceedings of the SIGCHI Conference on Human Factors in Computing Systems, May 5, 2012, pp. 2855-2864.

"Scroll Documents for Confluence", Retrieved from: https://marketplace.atlassian.com/apps/1217608/scroll-documents-for-confluence?hosting=cloud&tab=overviewhttps://marketplace.atlassian.com/apps/1217608/scroll-documents-for-confluence, Retrieved on Jun. 22, 2018, 4 Pages.

* cited by examiner

| Historical Modification Data 700 |||| 
|---|---|---|---|
| Modification State | Modification Location | Modification Time | Modification Owner |
| - Null - | - Null - | $T_0$ | - Null - |
|  | Section 1 | $T_1$ | User 1 |
|  | Section 2 | $T_2 - T_3$ | User 2 |
|  | Section 1 | $T_2$ | User 2 |
|  | Section 1 | $T_3 - T_4$ | User 1 |
|  | Section 2 | $T_4 - Current$ | User 2 |
|  | Section 1 | $T_5 - Current$ | User 1 & User 2 |
FIGURE 7

SELECTIVELY CONTROLLING MODIFICATION STATES FOR USER-DEFINED SUBSETS OF OBJECTS WITHIN A DIGITAL DOCUMENT

BACKGROUND

Various applications enable users to edit objects (e.g., drawing elements, text, etc.) within a document. For example, whiteboard applications enable users to create digital ink markings, text, and other objects on a digital canvas. Oftentimes digital documents are created in collaborative settings such as business meetings, brainstorming sessions, and classrooms. These types of settings frequently result in digital documents undergoing significant changes as various users modify objects within the digital document. For example, a digital object that multiple users are collaboratively editing to develop a concept may be cycled through a sequence of different versions. It may be desirable for a variety of reasons to return a particular digital object to a previous version by rolling back modifications to that particular digital object.

Some existing applications record a sequential editing history to enable users to rollback (e.g., "undo") modifications to a digital document in the reverse of the sequential order in which the modifications originally occurred. For example, if a digital document has undergone a lengthy sequence of modifications, an "undo" button (e.g., as typically provided in modern whiteboard and word processing applications) may enable a user to rollback the last modification to the digital document, and then the immediately previous modification, and so on.

Although a history of edits or a recording of a meeting can be useful for understanding some historical details, current technologies do not always enable users to analyze all aspects of the edited content. For instance, consider a scenario where a user drew a first object in the top-half of a whiteboard, and then erased that first object before drawing a second object on the bottom-half of the whiteboard. In such a scenario, viewing the edit history or viewing a recording of a meeting about such edits would never allow the user to view the first object and the second object at the same time. Such tools would never enable the user to perform a side-by-side comparison of the objects. Users would need to scroll back and forth on an edit timeline in order to do any type of comparison of the objects. Such methods can lead to a poor user experience and numerous interactions that can lead to an inefficient use of computing resources.

In addition, some existing applications do not enable users to tailor how the various versions of a digital document are presented. In fact, some applications are rather limited to rolling back modifications of all content in a reverse sequence. To illustrate, consider a scenario where a user draws a first object alongside a second object within a digital document. Suppose that another user then modifies the first object while concurrently modifying the second object. Under these circumstances, some modifications to the first object may not overlap with modifications to the second object within the sequential editing history. Thus, without saving multiple copies of the digital document file (which results in additional hard drive consumption), existing applications do not allow users to view the original version of the first object alongside the modified version of the second object and vice versa.

It is with respect to these and other considerations that the disclosure made herein is presented.

SUMMARY

The disclosed technologies enable users to view a particular modification state of selected objects of a document without impacting the display of unselected objects. For example, a user can create a number of objects, e.g., drawing objects or text, located at different sections of a document. The user may perform modifications to each object that result in a sequence of modification states for each object. The user may select a subset of the objects by the use of an input gesture, which can be an inking gesture, a voice command, or any other suitable input for selecting objects. The user can then view a specific modification state of the selected objects that existed at a particular point in time, while viewing a modification state of other objects, e.g., the unselected objects, that existed at another point in time. In this way, the user is enabled to concurrently view different versions of each object even if the particular versions did not coexist at any point in time during the user's editing sequence. In some configurations, the user may select a particular object or a group of objects and selectively rollback (e.g., "undo") modifications that were applied to the selected objects without rolling back modifications that were applied to other objects.

In one illustrative example, a system causes a display device to render multiple objects at different sections of a digital document. For example, a user may be operating an application to edit a first sketch that is located at a first content section of the digital document and a second sketch that is located at a second content section of the digital document. The application may cause the display device to concurrently render current versions of both the first sketch and the second sketch. While the user is editing the sketches, the application may generate historical modification data that defines modification states in association with individual objects at various times throughout the user's editing process. The individual objects may be graphical elements that form the first sketch and the second sketch. For example, the individual objects may be raster-based and/or vector-based objects that graphically represent lines, curves, and/or points of one or more colors.

The system may receive a first user input that indicates a particular content section of the digital document. For example, the user may want to return the first sketch to a previous version (i.e., some version that existed prior to the current version that is being displayed) and, therefore, may select the first content section at which the first sketch is located. The first input may be in the form of an inking gesture, voice command, or other input indicating a selection of the first sketch.

Based on the first user input, the system may determine a subset of the objects that is associated with the first content section. For example, the system may determine which individual graphical elements are located wholly or partially within the particular content section indicated via the first user input. In an exemplary implementation, the first user input corresponds to the user manipulating a computer curser to create an outline around the first sketch on the display device. In such instances, the system may identify the subset of objects as those objects which are located within the outline. For illustrative purposes, the subset of the objects can also be referred to herein as "selected objects."

The system may also receive a second user input that indicates a time within a modification history of the digital document that corresponds to the previous version of the first sketch being rendered. In some instances, the second user input may be received via user interaction with a user input (UI) control that is displayed in association with the selected content section, i.e., the first content section in the immediate example. One example of a UI control may facilitate an input with respect to a graphical timeline object. Various times within the modification history may be measured with or without reference to a clock, a set of events, and/or a calendar. For example, in some implementations, various times within the modification history can be measured in terms of a sequential order of modification events. In another example, UI control may facilitate a voice input captured by a microphone of a computing device. The voice input may indicate an event, a time, or any other type of indicator defining a modification state of objects associated with a selected content section. For illustrative purposes, a modification state is also referred to herein as a "version" of objects that existed at a particular time within the modification history of a digital document.

The system may respond to the second user input by causing the display device to render the previous version of the first sketch at the first location while concurrently rendering the current version of the second sketch at the second location. More particularly, since the system has determined the subset of the objects that forms the first sketch based on the first user input, the system can limit application of the second user input to the subset of the objects. In one non-limiting example, the UI control may facilitate a user input with respect to a graphical timeline to cause a computing device to display the current version of the subset of the objects or the previous version of the subset of the objects. In this way, the user is provided with a tool for selectively returning a subset of objects (that is selected via the first user input) to previous modification state(s) without impacting the modification state(s) of other objects that are excluded from the sub set.

The technologies disclosed herein improve efficiencies with respect to a variety of computing resources such as non-volatile memory resources, volatile memory, and processing resources. For example, the disclosed technologies mitigate any need for a user to create multiple discrete instances of a digital document in order to view specific versions of objects that did not coexist at any instance in time during an editing process. To illustrate this point, suppose that a user that is using a modern application to edit two sketches wants to concurrently view specific versions of the two sketches which have not previously coexisted (i.e., been rendered concurrently). Under these circumstances, the user would not be able to selectively return the two sketches to the desired versions because modern applications are limited to rolling back modifications in the reverse of the sequential order in which they originally occurred.

Therefore, in order to concurrently view these specific versions of the two sketches, the user would need to duplicate the digital document—resulting in twice as much storage space being consumed on one or more computing devices. Then, the user would need to open both of the original and duplicate instances of the digital document—increasing the amount of memory being allocated to viewing the digital document(s). Finally, the user would be required to rollback changes to one of the two sketches in the original instance of the digital document and, if needed, rollback changes to the other of the two sketches in the duplicate instance of the digital document. Even at this point, despite being displayed to the user concurrently, these specific versions of the two sketches still would not coexist within the same digital document. Achieving this result would require the additional operations of copying the desired version of one of the sketches to a memory allocation of one or more computing devices (e.g. a "clipboard" memory allocation) and then writing the desired version from the memory allocation into the other instance of the digital document. It can be appreciated that the foregoing sequence of operations would necessarily consume an incremental amount of computing resources. Thus, by mitigating the need for this sequence of operations to be performed, the techniques disclosed herein prevent consumption of this incremental amount of computing resources.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 7 illustrates exemplary historical modification data that is recorded in association with a digital document to facilitate selectively altering modification states of "selected" subsets of graphical objects without affecting other graphical objects that are outside the "selected" sub sets.

FIG. 8B illustrates an exemplary implementation in which a user has selected multiple portions of a word processing digital document for controlling the modification history with respect to.

DETAILED DESCRIPTION

This Detailed Description discloses aspects of a system that enables users to selectively return a display of a subset of objects within a digital document to previous modification states without impacting other objects that are excluded from the subset. Generally described, one or more users can edit the digital document to create multiple versions of different objects at different sections of a digital document. Under a variety of circumstances, a user's editing process may include a sequence of modifications that result in certain versions of the different objects never coexisting at any singular point in time. Then, one or more users may select a particular object and selectively rollback (e.g., "undo") modifications that occurred with respect to the selected object without impacting the modification state for other objects within the digital document. In this way, the user is enabled to concurrently view particular versions of the different objects regardless as to whether these particular versions coexisted at any singular point in time during the user's editing process.

The presently disclosed techniques are believed to be applicable to a variety of systems and applications in which one or more users are enabled to modify graphical objects of a digital document. Aspects of this disclosure are predominantly disclosed in the context of a digital canvas application being used first to create various versions of different sketches at different content sections of a digital canvas and then subsequently to change a modification state of one sketch without impacting a modification state of another sketch. The presently disclosed techniques are not necessarily limited to such an implementation. The presently disclosed techniques are similarly applicable to content expressed in word processing applications, spreadsheet applications, computer-aided design ("CAD") applications, slideshow presentation applications, photograph editing applications, and so on. These variations, and other variations, shall be considered to be applicable to the concepts disclosed herein without departing from the scope of the present disclosure.

Figure 1:
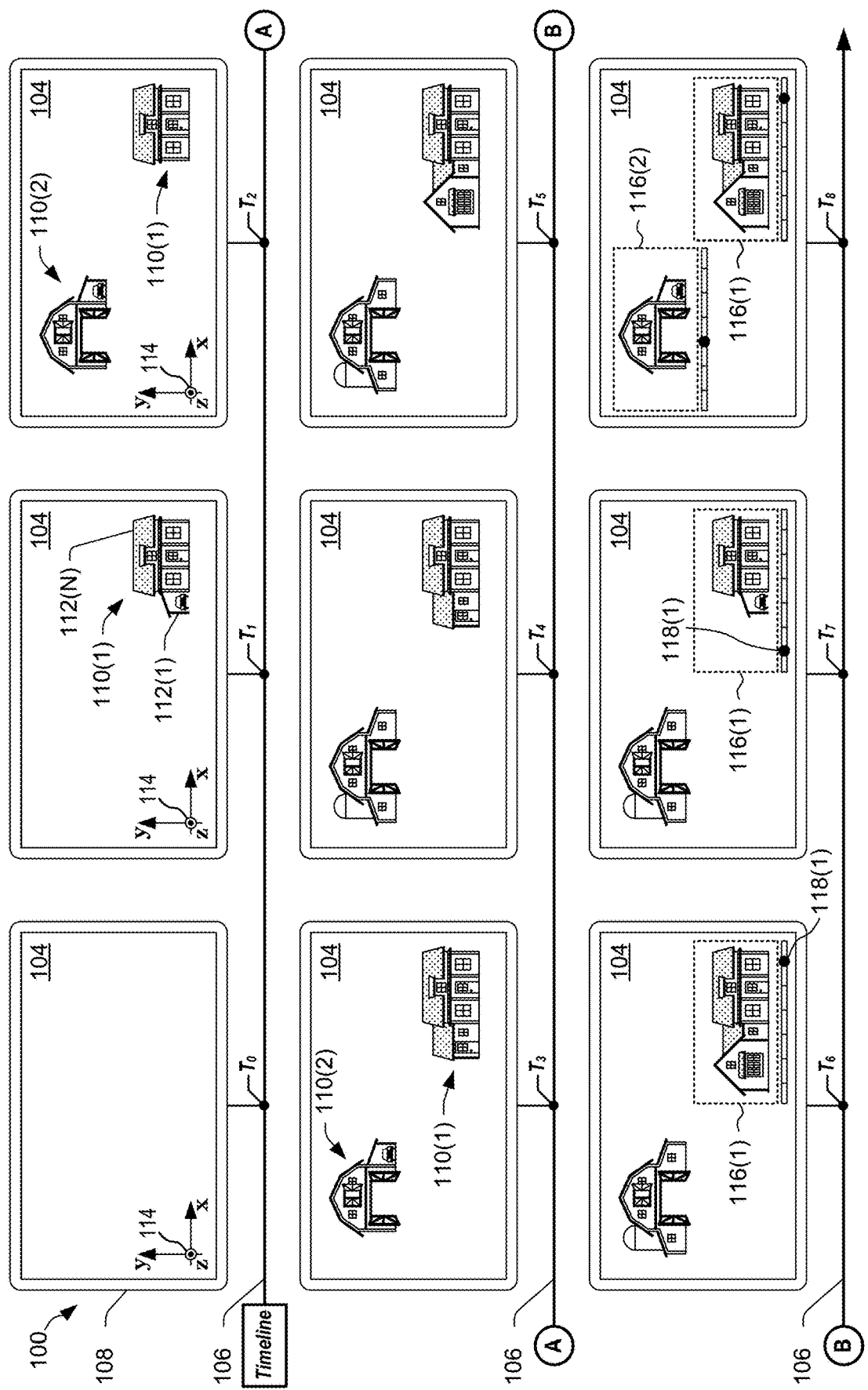
FIG. 1 illustrates a pictorial flow diagram that shows an illustrative editing process during which graphical objects are edited at different sections of a digital document and then modification states of subsets of the graphical objects that are within "selected" sections are altered without affecting other graphical objects that are outside the "selected" sections.

Turning now to FIG. 1, illustrated is a pictorial flow diagram 100 that shows an illustrative editing process during which graphical objects are edited at different sections 116 of a digital document 104 and then modifications states of subsets of the graphical objects that are within "selected" sections 116 are altered (e.g., rolled back) without affecting other graphical objects that are outside the "selected" sections 116. The pictorial flow diagram 100 is illustrated with respect to a timeline 106 along which a sequence of screenshots is shown on a display device 108. As illustrated, the sequence of screenshots includes nine screenshots that each correspond to a particular time during the editing process. Various ones of the illustrated screenshots show specific versions of one or more sketches. The level of graphical detail illustrated with respect to these specific versions is not to be construed as limiting in any way and is provided solely for the specific purpose of enabling the different versions of the different sketches to be visually distinguishable. In particular, an ability to visually distinguish between different versions of the sketches is useful in gaining an appreciation of various aspects of the disclosed techniques.

At time $T_0$, one or more users have deployed an application to initiate an editing session of the digital document 104. For purposes of the discussion of FIG. 1, the application is a digital canvas application that facilitates editing of graphical objects within the digital document 104. Exemplary graphical objects include, but are not limited to, raster-based and/or vector-based digital sketches, alphanumerical characters, videos, and any other suitable type of graphical object. As illustrated, at time $T_0$ the digital document 104 is empty or blank in the sense that the digital document 104 is void of any graphical objects. For example, the one or more users may have just created a blank digital canvas to use during a collaborative concept development session during which they will draw plans for developing a vacant rural property.

As used herein, the term "digital document" (or simply "document") refers to a data file that contains information that is input by one or more users through one or more computing applications to define one or more graphical objects. For example, a data file that is generated by a digital canvas application (e.g., the Microsoft® Whiteboard application) that receives input from various users across one or more devices to define a variety of graphical objects such as charts, drawings, text (typed and/or written) may be aptly described as a digital document. Exemplary digital documents further include data files that contain information defining graphical objects based on user input that is received via word processor applications, spreadsheet applications, slideshow presentation applications, 3D CAD applications, and so on.

At time $T_1$, the one or more users have edited the digital document 104 by adding a first version of a first sketch 110(1). As with other sketches 110 described elsewhere herein, the first version of the first sketch 110(1) may be formed based on a structured combination of individual graphical objects 112. For illustrative purposes, the first version of the first sketch 110(1) is a small-sized house with a carport on the left side. At least a portion of the carport is formed by a first graphical object 112(1) whereas at least a portion of the small-sized house is formed by an $N^{th}$ graphical object 112(N). In some implementations, locations for individual ones of the graphical objects 112 may be defined in relation to a positional reference system 114 that is associated with the digital document 104. Although the positional reference system 114 is shown in the form of a Cartesian coordinate system for illustrative purposes, other types of positional reference systems 114 are further contemplated and are within the scope of the present disclosure.

At time $T_2$, the one or more users have further edited the digital document 104 by adding a first version of a second sketch 110(2). For illustrative purposes, the first version of the second sketch 110(2) is a small barn with a carport. At time $T_2$, the one or more users have further edited the digital document 104 by changing the first sketch 110(1) from the first version into a second version. For illustrative purposes, the second version of the first sketch 110(1) is the same small-sized house as was included in the first version but with the carport removed. It can be appreciated that the first sketch 110(1) and the second sketch 110(2) are each formed of corresponding sets of graphical objects 112 and that each of these sets of graphical objects occupy different regions of the digital document 104. For example, the first sketch 110(1) occupies a lower right region of the digital document 104 whereas the second sketch occupies an upper left region of the digital document 104.

At time $T_3$, the one or more users have further edited the digital document 104 by changing the first sketch 110(1) from the second version into a third version. For illustrative purposes, the third version of the first sketch 110(1) is a medium-sized house.

At time $T_4$, the one or more users have further edited the digital document 104 by changing the second sketch 110(2) from the first version into a second version. For illustrative purposes, the second version of the second sketch 110(2) is a large barn with a grain silo.

At time $T_5$, the one or more users have further edited the digital document 104 by changing the first sketch 110(1) from the third version into a fourth version. For illustrative purposes, the fourth version of the first sketch 110(1) is a large-sized house.

For purposes of the present discussion, times $T_0$ through $T_5$ represent the portion of the editing process in which the one or more users are actively editing the digital document 104 by, for example, adding and/or modifying the various graphical objects 112. Notably, during this portion of the editing process certain versions of the first sketch 110(1) and the second sketch 110(2) may coexist in time whereas other versions of these sketches 110 may never coexist in time. For example, as illustrated, at time $T_2$ the second version of the first sketch 110(1) and the first version of the second sketch 110(2) coexist in time within the digital document 104. Thus, in accordance with conventional (e.g., existing) applications that are limited to rolling back modifications to digital documents in the reverse of the sequential order in which the modifications originally occurred, it may be possible for the one or more users to edit the document after $T_2$ and then rollback these edits so that the second version of the first sketch 110(1) and the first version of the second sketch 110(2) are once again concurrently rendered by the display device 108.

In contrast however, at no point in time during the editing process that takes place between times $T_0$ through $T_5$ do the first version of the first sketch 110(1) and the second version of the second sketch 110(2) coexist in time. Similarly, at no point in time during the editing process that takes place between times $T_0$ through $T_5$ do the fourth version of the first sketch 110(1) and the first version of the second sketch 110(2) coexist in time. Thus, due to the aforementioned limitations regarding how modifications can be rolled back, conventional applications would be ill-suited for concurrently rendering such non-coexistent versions. The following discussion of times $T_6$ through $T_8$ illustrates how the techniques described herein provide a market improvement over these conventional applications.

At time $T_6$, the one or more users have provided a first user input that indicates a first content section 116(1) of the digital document 104. For purposes of the discussion of FIG. 1, presume that the user(s) want to return the first sketch 110(1) to the first version, i.e., the version in which the first sketch is a small-sized house with a carport on the left side. Therefore, the user(s) provide the first user input in order to select the first content section 116(1) by outlining the portion or region of the digital document 104 at which the first sketch 110(1) is located. As described in more detail below, the first user input may correspond to the user(s) creating an outline around the first sketch 110(1) on the display device 108.

As used herein, the term "content section" refers to a distinct part or portion of a digital document 104 as graphically displayed via one or more computing applications. For example, a predefined area of a digital canvas document that is encompassed by a rectangular boundary which is defined in reference to a positional reference system 114 (e.g., a Cartesian coordinate system) of the digital canvas document may be aptly described as a content section. As another example, a predefined listing of cells within a spreadsheet document (e.g., a grouping of cells defined as "A1:B4" within a Microsoft® Excel® document) may be aptly described as a content section. In another example, a paragraph, page, sentence or any portion of a text document can be selected and referred to herein as a content section.

Based on the first user input at time $T_6$, a subset of the graphical objects 112 that correspond to the first content section 116(1) are identified. For example, as illustrated, the digital document 104 includes a plurality of graphical objects 112 that have been added and/or modified by the one or more users. A first subset of the plurality of graphical objects 112 corresponds to (e.g., forms) the first sketch 110(1) whereas a second subset of the plurality of graphical objects 112 corresponds to the second sketch 110(2). Here, the first subset of graphical objects 112 may be determined by identifying those individual graphical objects 112 that are located wholly or partially within the first content section 116(1).

At time $T_7$, the one or more users have provided a second user input that indicates a time within a modification history of the digital document 104 that corresponds to the first version of the first sketch 110(1) being rendered at time $T_1$. For example, the second user input may correspond to a user manipulating a first UI control 118(1) that is displayed in association with the first content section 116(1) that is defined via the first user input. As illustrated, in response to the combination of the first user input and the second user input, the modification state of the first sketch 110(1) is dynamically altered whereas the modification state of the second sketch 110(2) remains static (e.g., is unaffected). In this way, the user(s) are enabled to cause the display device 108 to concurrently render both the first version of the first sketch 110(1) and the second version of the second sketch 110(2)—despite these two versions having never coexisted during the editing process that took place between times $T_0$ through $T_5$. A user can interact with the UI control 118(1) to select any point, as shown by the black dots, to select a particular version or modification state of the first sketch 110(1). Other types of input, such as a voice command, can also be used to select a particular version or modification state of the first sketch 110(1).

In some embodiments, the techniques described herein enable user(s) to dynamically control the modification states associated with multiple discrete content regions 116 of the digital document 104. For example, at time $T_8$, the user(s) have provided a third user input to select another content section 116 and a fourth user input to dynamically alter the modification state of graphical objects 112 that are included therein. More specifically, the third user input indicates a second content section 116(2) of the digital document 104 within which the second sketch 110(2) is located. The fourth user input indicates a time within the modification history of the digital document 104 that corresponds to the first version of the second sketch 110(2) being rendered at time $T_2$. The fourth user input may be received via a second UI control 118(2) that is displayed in association with the second content section 116(2).

As illustrated, the combination of the third user input and the fourth user input results in the currently rendered version of the second sketch 110(2) at Time $T_8$ being reverted from the second version (i.e., the large barn with the grain silo) back into the first version (i.e., the small barn with the carport). As further illustrated at Time $T_8$, the first UI control 118(1) has been further manipulated to revert the first sketch 110(1) back into the fourth version which appears at Time $T_6$. Thus, in various implementations, individual UI controls 118 may correspond to individual content sections 116 to provide users with a tool for selectively toggling specific subsets of objects between different modification states without impacting the modification state(s) of other objects that are excluded from the specific content section subsets.

Figure 2A:
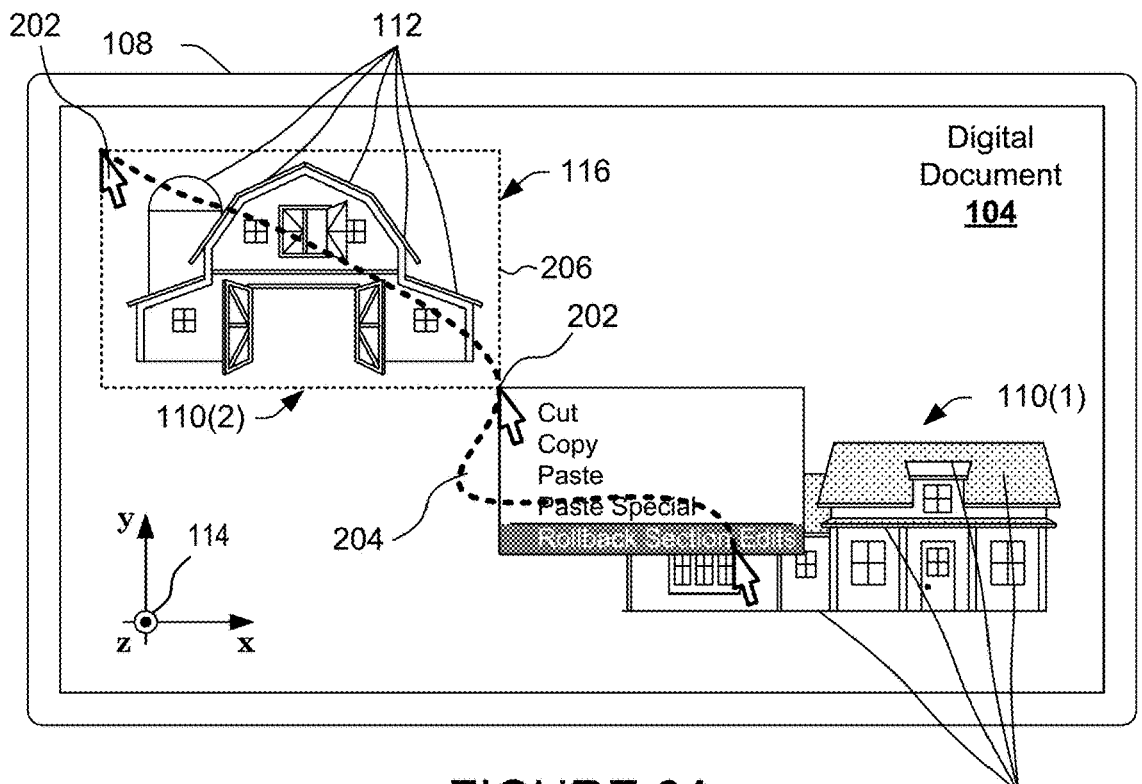
FIG. 2A illustrates an exemplary sequence of operations that are performed via a curser UI element to generate a user input that defines a content section in accordance with the techniques described herein.

Turning now to FIG. 2A, an example user interface shows a sequence of operations that are performed to generate a user input that defines a content section 116. As shown in FIG. 2A, a curser UI element 202 shows how a pointing device or a touch device can be used to select a content section 116. In this example, the curser UI element 202 is manipulated along a path 204 that begins at an upper-left corner of the content section 116 and then flows to the lower-right corner of the content section 116. This portion of the path 204 may be used to define a boundary 206 of the content section 116 with respect to a positional reference system 114. For example, a user may define the boundary 206 by depressing a button on a computer mouse while the curser is positioned at the upper-left corner of the content section and then releasing the button once the curser is positioned at the lower-right corner of that content section. This may result in a menu being exposed in an overlay of the digital document 104 from which the user may select various actions that can be performed with respect to the graphical objects 112 that are encompassed by the boundary 206. As illustrated, the curser UI element 202 has been further moved along the path 204 on the overlay menu that has been exposed to select a "Rollback Section Edits" option. This example is provided for illustrative purposes and is not to be construed as limiting. Such a selection can also be performed by the use of a touch screen gesture, a voice command, or any other suitable user input for selecting the content section. In one example of a voice command, a user can provide a statement such as "select the barn," "select the house," "select any object edited by Bob," "select any item or text that was edited in the last ten minutes of yesterday's meeting," etc. A voice input, an input string, or any other suitable input can provide a time, event, a date, a user, or any other input data that identifies one or more objects of a digital document.

Based on the illustrated user input received in FIG. 2A, a subset of graphical objects 112 that correspond to the content section 116 may be determined. Determining this subset may include analyzing the individual graphical objects that are included within the digital document 104 to identify those specific graphical objects which are located within the boundary 206 that is defined via movement of the curser UI element 202. Thus, it can be appreciated that in various implementations the locations of the individual graphical objects 112 and the various boundaries 206 may all be defined in relation to the positional reference system 114.

Figure 2B:
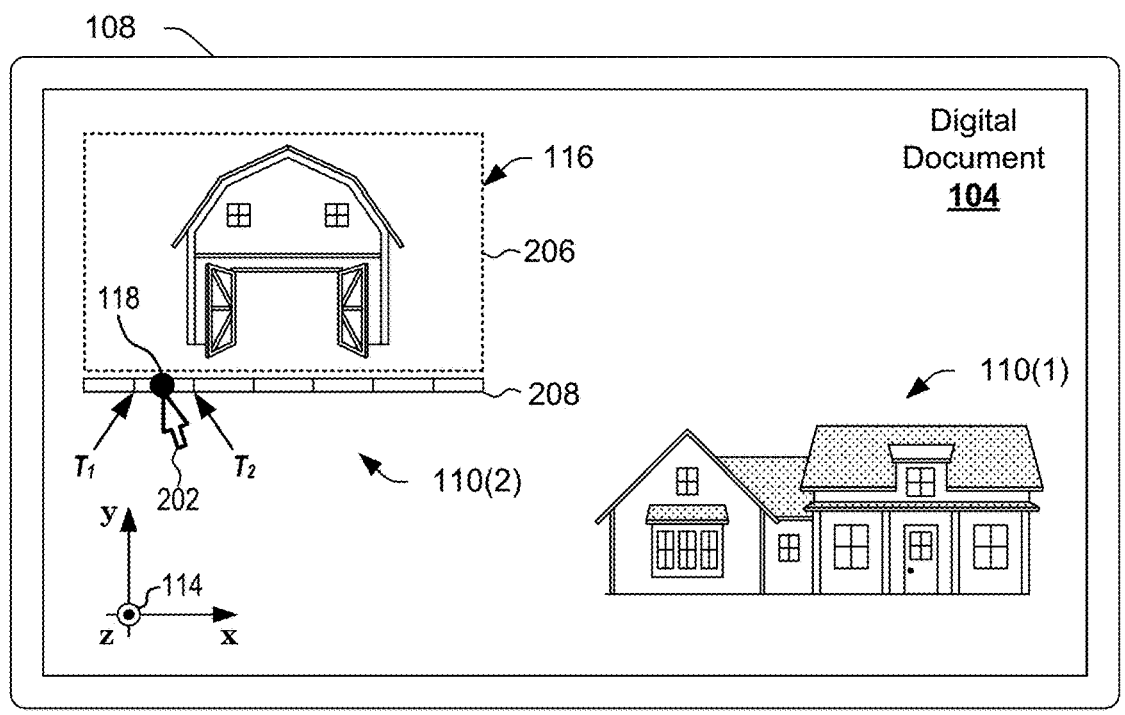
FIG. 2B illustrates an exemplary UI control that facilitates user input indicating a time within a modification history of the digital document at which to render a subset of graphical objects that reside within the content section selected in FIG. 2A.

Turning now to FIG. 2B, illustrated is an exemplary UI control 118 that facilitates user input that indicates a time within a modification history of the digital document 104 at which to render the determined subset of graphical objects 112 that reside within the content section 116. In this specific but non-limiting example, the UI control 118 is movable along a graphical timeline object 208 to cause the display device 108 to render the subset of graphical objects 112 that are encompassed by the boundary 206 at different modification states—without impacting the rendering of any objects that are excluded from the subset. For example, a user may "grab" the UI control 118 by positioning the curser UI element 202 over it and depressing a button on a computer mouse. Then, while holding the button in the depressed state, the user may slide the UI control 118 back-and-forth along the graphical timeline object 208 to dynamically control the modification state of the subset of graphical objects 112. For example, as illustrated, the UI control 118 has been placed at a position along the graphical timeline object that corresponds to a point in time that is between $T_1$ and $T_2$ (e.g., a point in time at which the first version of the second sketch 110(2) was still yet to be fully developed).

Figure 3A:
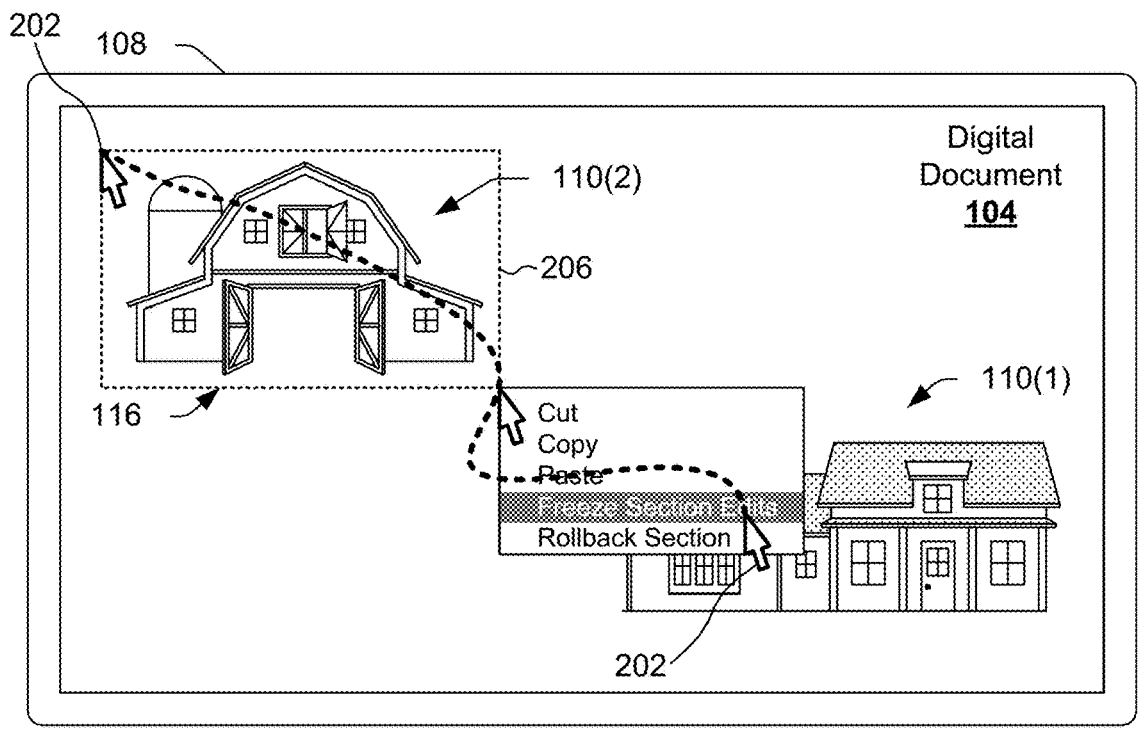
FIG. 3A illustrates an exemplary sequence of operations that are performed via a curser UI element to define a content section of a digital document and then to freeze (e.g., "lock") a modification state of graphical objects within the user-defined content section.
Figure 3B:
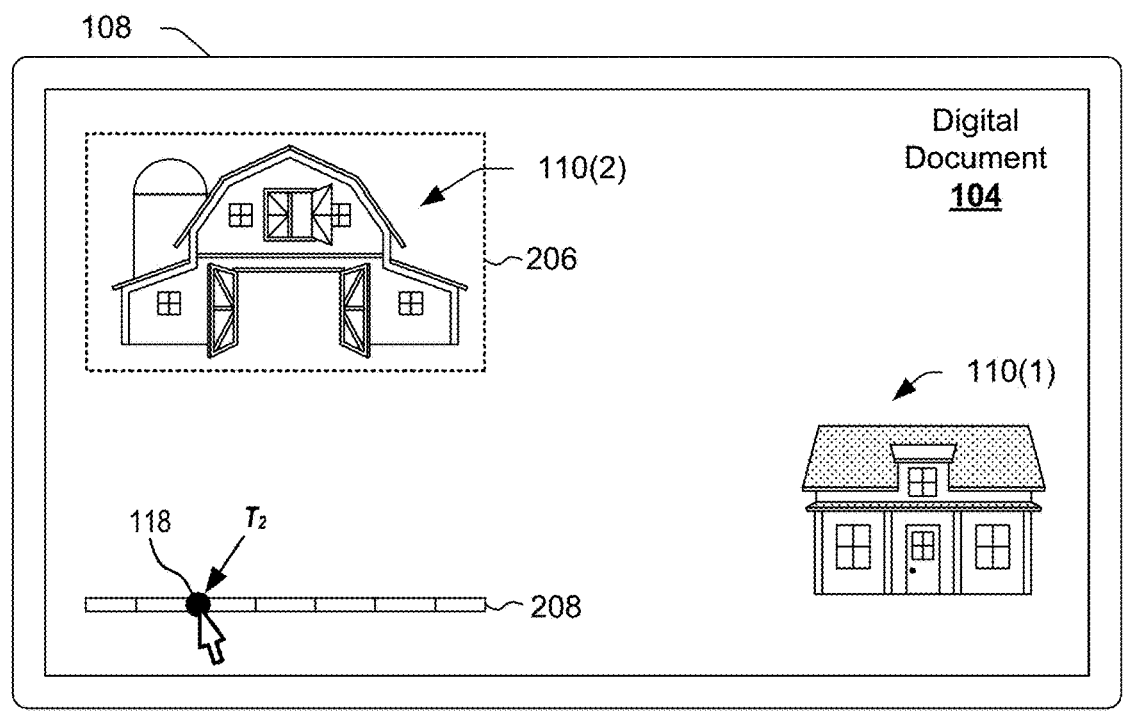
FIG. 3B illustrates an exemplary UI control that facilitates user input indicating a time within a modification history of the digital document at which to render a subset of graphical objects that reside outside of the content section selected in FIG. 3A.

FIGS. 2A and 2B correspond to an implementation in which the user input received via the UI control 118 controls the modification state of only those individual graphical objects 112 that are located within some user-defined content section 116. However, in other implementations, implementation parameters may be reversed so that user input received via the UI control 118 controls the modification state of only those individual graphical objects that are located outside of some user-defined content section 116. FIGS. 3A and 3B convey details of such an alternative implementation.

Although implementations of the present disclosure are predominantly described in the context of a content section being a single content section defined by a single boundary 206, it is within the scope of the present disclosure that a content section be defined by multiple boundaries 206 that enclose multiple non-contiguous portions of a digital document. For example, a user may define three non-contiguous boundaries that each fully encompass separate portions of a digital document 104. The aggregate of the graphical objects 112 included within these three separate portions may then be identified as the subset of graphical objects with respect to which a user is then able to control the modification state. For example, a single user input that is received in association with a single UI control 118 may cause the modification states of all objects 112 within each discretely defined boundary to change accordingly. Additionally, or alternatively, different user-defined boundaries 206 may be each individually associated with a corresponding UI control. For example, if a user has defined three discrete boundaries 206 within a digital document, then in some implementations a user may be provided with an individual UI control in association with each individual discrete boundary 206 so that the user can control the specific modification state that objects within each separate boundary are rendered in accordance with.

Turning now to FIG. 3A, illustrated is an exemplary sequence of operations that are performed via a curser UI element 202 in order to generate a user input that defines a content section 116 in accordance with the techniques described herein. FIG. 3A is similar to FIG. 2A with the exception that rather than selecting a "Rollback Section Edits" option as previously described, in FIG. 2A the curser UI element 202 is used to select a "Freeze Section Edits" option. Thus, rather than electing to alter the currently rendered modification state of the graphical objects that are located within the content section 116 (as is the case in FIG. 2A), in FIG. 3A the user is electing to alter the currently rendered modification state of the graphical objects that are located outside of the content section 116. Based on the user input received in FIG. 3A, a subset of graphical objects 112 that correspond to the other content section 116(1) may be determined. For example, the subset of graphical objects 112 may be defined as those objects that reside outside of the now frozen content section 116.

Turning now to FIG. 3B, illustrated is an exemplary UI control 118 that facilitates user input that indicates a time within a modification history of the digital document 104 at which to render the determined subset of graphical objects 112 that reside outside of the content section 116. FIG. 3B is similar to FIG. 2B with the exception that user input that is received in association with UI control 118 directly affects the rendered modification state of the first sketch 110(1) due to the subset of graphical objects 112 forming the first sketch 110(1) residing outside of the content section 116. Stated plainly, in FIG. 3B the graphical objects 112 within the content section 116 that is defined by the user remain frozen (e.g., "locked") whereas the other graphical objects 112 in the first sketch 110(1) that are outside of the content section 116 may be altered via manipulation of the UI control 118. In the illustrated example, the manipulation of the UI control 118 causes the first sketch 110(1) to revert from the fourth version back to the second version.

It can be appreciated with respect to FIGS. 1 through 3B that various implementations of the techniques described herein provide tools for concurrently viewing specific versions of objects 112 (and/or sets of objects) even if those specific versions did not coexist at any instance in time during an editing process. Thus, in many situations such implementations improve computing efficiencies with respect to, for example, non-volatile memory resources. For example, under circumstances where a user wants to concurrently view specific versions of sketches (or other graphical elements) that haven't previously coexisted, the disclosed techniques enable the user to do so without duplicating an entire digital data file 104—thereby reducing the proliferation of duplicative data instances on various storage devices.

In some implementations, a user may be provided with first UI controls in association with a selected subset of graphical objects that reside within a boundary 206 and second UI controls in association with other graphical objects that reside outside of the boundary 206. In this way, the user will be enabled to use the first UI controls to control the modification state of the selected subset of graphical objects while at the same time using the second UI controls to control the modification state of those graphical objects that are not included within the selected subset.

Figure 4A:
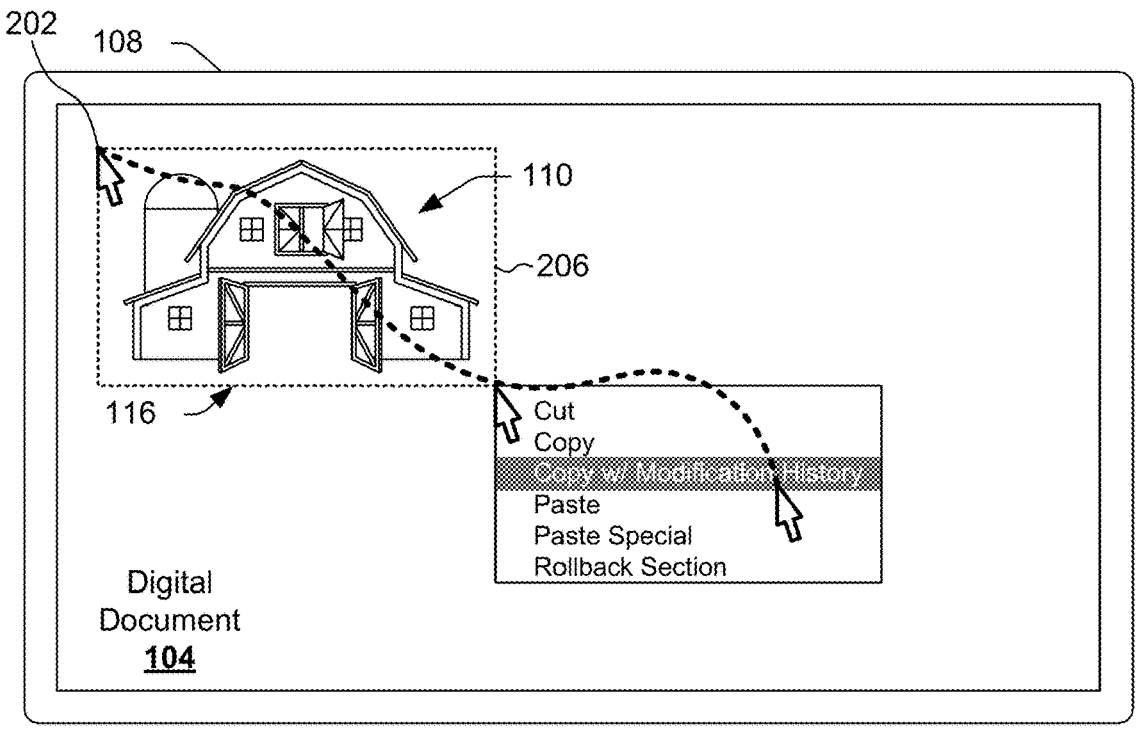
FIG. 4A illustrates an exemplary sequence of operations for duplicating graphical objects that are contained within a content section along with modification history data that corresponds to these graphical objects.

Turning now to FIG. 4A, illustrated is an exemplary sequence of operations that are performed to duplicate graphical objects 112 that are contained within a content section 116 and to further duplicate modification history data that corresponds to these graphical objects 112. FIG. 4A is similar to FIG. 2A with the exception that rather than selecting a "Rollback Section Edits" option, in FIG. 4A the curser UI element 202 is used to select a "Copy w/ Modification History" option. In response to the user(s) creating the boundary 206 to define the content section 116 and then selecting the "Copy w/ Modification History" option, a duplicative instance of a sketch 110 is created within the digital document 104. Furthermore, modification history data that was recorded by an application during creation of the sketch 110 (and/or the various versions thereof) remains tied to the duplicative instance of the sketch 110.

Figure 4B:
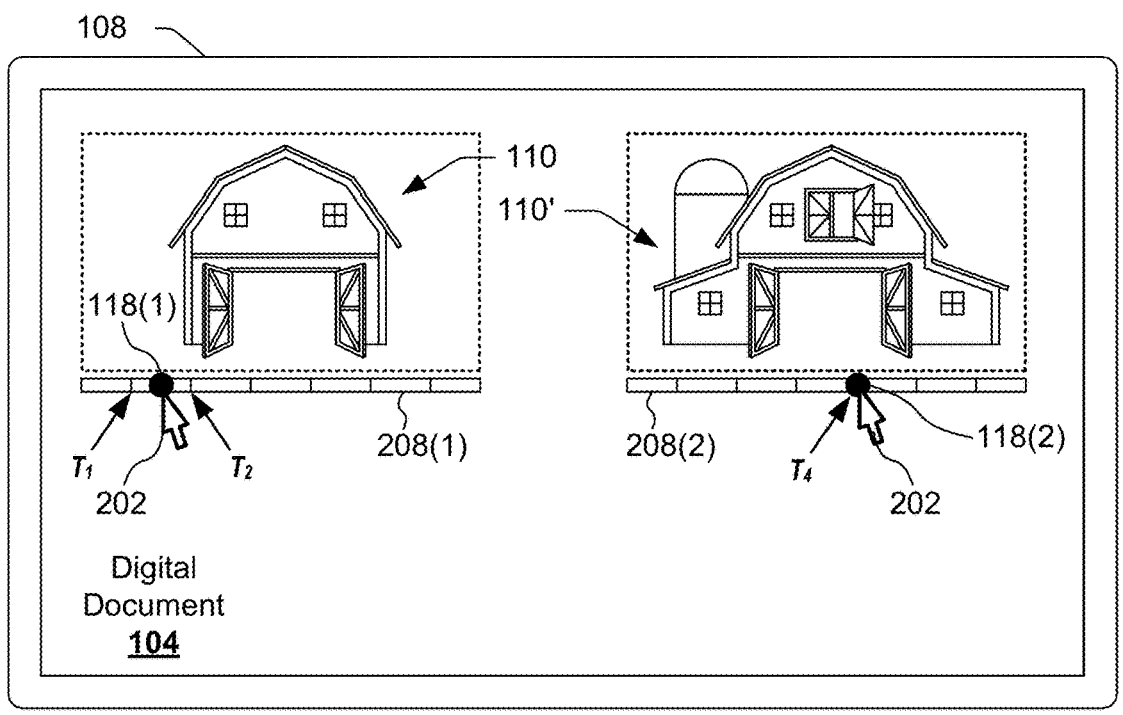
FIG. 4B illustrates a first UI control for controlling a modification state of an original instance of the graphical objects selected in FIG. 4A and a second UI control for controlling a modification state of a duplicative instance of the graphical objects selected in FIG. 4A.

FIG. 4B illustrates both an original instance of the sketch (labeled 110) and a duplicative instance of the sketch (labeled 110'). In various implementations, one or more UI controls 118 may be displayed in association with one or both of the original instance of the sketch 110 or the duplicative instance of the sketch 110'. For example, as illustrated, a first UI control 118(1) is shown in association with the original instance of the sketch 110 and a second UI control 118(2) is shown in association with the duplicative instance of the sketch 110'. In FIG. 4B the first UI control 118(1) has been placed at a position along a first graphical timeline object 208(1) to control the modification state at which the display device 108 renders the original instance of the sketch 110. Here, the rendered modification state of the original instance of the sketch 110 corresponds to a point in time that is between $T_1$ and $T_2$. At the same time, the second UI control 118(2) has been placed at a position along a second graphical timeline object 208(2) to control the modification state at which the display device 108 renders the duplicative instance of the sketch 110'. Here, the rendered modification state of the duplicative instance of the sketch 110' corresponds to $T_4$.

It can be appreciated with respect to FIGS. 4A and 4B that various implementations of the techniques described herein provide tools for conducting side-by-side comparisons of various versions of an individual sketch without having to duplicate an entire digital document 104. Thus, in many situations such implementations improve computing efficiencies with respect to, for example, non-volatile memory resources. For example, under circumstances where a user wants to concurrently view different versions of a single sketch (or other graphical elements), the disclosed techniques enable the user to do so without duplicating an entire digital data file 104—thereby reducing the proliferation of duplicative data instances on various storage devices.

Figure 5:
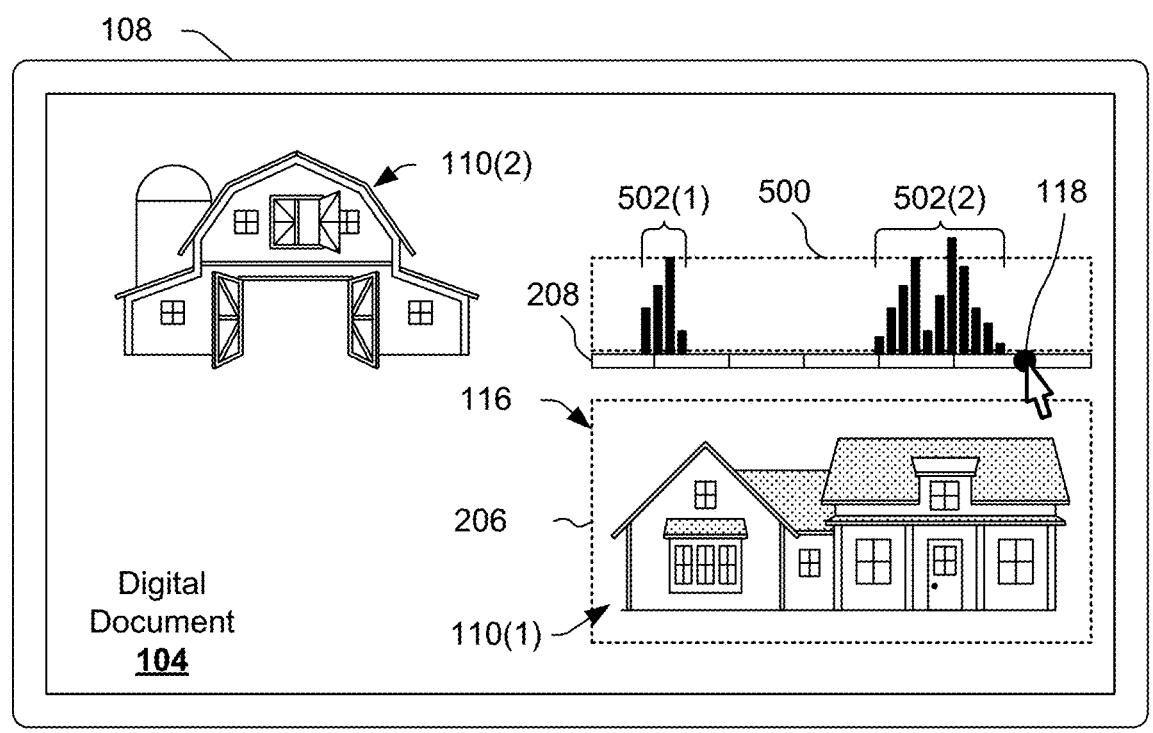
FIG. 5 illustrates an exemplary implementation in which a histogram is displayed in association with a user-defined content section to visually indicate levels of editing activity that occurred at various times during an editing process.

Turning now to FIG. 5, illustrated is an exemplary implementation in which a histogram 500 is displayed in association with a content section 116 to visually indicate levels of editing activity that occurred at various times during an editing process. An exemplary histogram 500 may include one or more activity level indicators 502 that are displayed in association with a graphical timeline object 208.

In the specifically illustrated example, the histogram 500 includes a first activity level indicator 502(1) indicating a range of time along the graphical timeline object 208 along which an amount of user modifications occurred with respect to the graphical objects 112 within the defined content section 116. The histogram 500 further includes a second activity level indicator 502(2) indicating a subsequent range of time along the graphical timeline object 208 along which some other amount of user modifications occurred with respect to the graphical objects 112 within the defined content section 116. Between the first activity level indicator 502(1) and the second activity level indicator 502(2) is a range of time along the graphical timeline object 208 at which no user modifications were occurring with respect to the graphical objects 112 within the defined content section 116.

Since only the first sketch 110(1) is included within the content section 116 of FIG. 5, the activity level indicators 502 that are included within the histogram 500 are only indicative of the levels of modification activity that was occurring with respect to the first sketch 110(1). Thus, upon selecting a specific content section 116 for which to dynamically modify the rendered modification state, a user may be able to view the histogram 500 and manipulate the UI control 118 into the ranges of time during which modifications were actually taking place. In this way the user(s) may be able to quickly scroll the UI control 118 to view the modification states during which the most relevant levels of modification activity were occurring with respect to predefined subsets of graphical objects of interest (e.g., subsets of graphical objects that are enclosed within the boundary 206).

Figure 6:
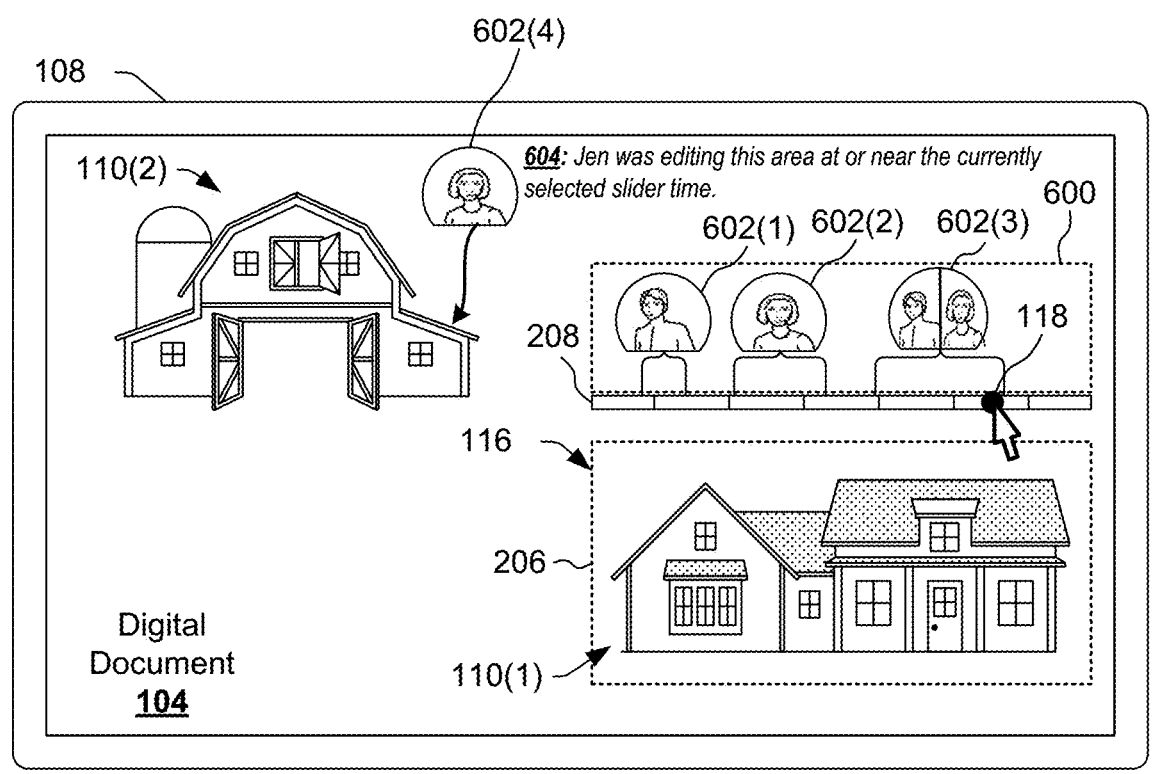
FIG. 6 illustrates an exemplary implementation in which a histogram is displayed in association with a user-defined content section to visually indicate modification activity of owners for editing activity that occurred at various times during an editing process.

Turning now to FIG. 6, illustrated is an exemplary implementation in which a histogram 600 is displayed in association with a defined content section 116 to visually indicate modification activity owners that correspond to editing activity that occurred during an editing process. An exemplary histogram 600 may include one or more activity owner indicators 602 that are displayed in association with a graphical timeline object 208.

In the specifically illustrated example, the histogram 600 includes a first activity owner indicator 602(1) through a fourth activity level indicator 602(4). The first activity owner indicator 602(1) corresponds to a first range of time along the graphical timeline object 208 during which a first user was making user modifications with respect to the graphical objects 112 within the content section 116. The second activity owner indicator 602(2) corresponds to a second range of time along the graphical timeline object 208 during which a second user was making user modifications with respect to the graphical objects 112 within the defined content section 116. As illustrated, individual ones of the activity owner indicators 602 may include graphical representations such as, for example, avatars that are visually representative of the individual users. In this way, if a user is interested in reviewing user modifications that were entered by a specific user (e.g., a boss or colleague), then that user can simply slide the UI control 118 into a region of the graphical timeline object 208 that is adjacent to (e.g., below, above, to the right of, to the left of) a graphical representation of the specific user.

In some implementations, the histogram 600 is configured to indicate ranges of time in which one or more users collaborated with respect to making user modifications to graphical objects 112 within the defined content section 116. As illustrated, for example, the third activity owner indicator 602(3) corresponds to a third range of time along the graphical timeline object 208 during which both the first user and the second user were concurrently making user modifications with respect to the graphical objects 112 within the defined content section 116. In this way, a user will be able to quickly and visually identify portions of a modification history of the digital document 104 during which collaborative modifications occurred.

In some implementations, one or more indicators may be rendered to graphically indicate regions of the digital document 104 at which user(s) were making modifications to objects 112 outside of the defined content section 116 at the specific time where the UI control 118 is set and/or within a threshold amount of time from the specific time where the UI control 118 is set. For example, in the illustrated example, the UI control 118 is set to a specific time within the aforementioned third range of time during which both the first user and the second user were concurrently making user modifications with respect to the graphical objects 112 within the defined content section 116. Suppose that at this time the second user was also making modifications to the graphical objects 112 that are located outside of the defined content section 116. To graphically indicate this information, the fourth activity owner indicator 602(4) is rendered outside of the defined content section 116 and identifies one or more specific regions of the digital document 104 that was concurrently being edited by the second user during the third range of time.

Turning now to FIG. 7, illustrated is exemplary historical modification data 700 that is recorded in association with a digital document 104 to facilitate selectively altering modification states of "selected" subsets of graphical objects 112 without affecting other graphical objects that are outside the "selected" subsets. As illustrated, the historical modification data 700 may indicate modification states associated with subsets of graphical objects, modification locations associated with subsets of graphical objects, modification times associated with subsets of graphical objects, and/or modification owners associated with subsets of graphical objects. For illustrative purposes, the modification states that are included within the historical modification data 700 correspond to the particular versions of the first sketch 110(1) and the second sketch 110(2) as described in FIG. 1 at Times $T_1$ and $T_2$, respectively.

The modification state data may be defined based on a variety of parameters that are suitable for instructing an application how to graphically render a variety of graphical objects. As a specific but nonlimiting example, a specific modification state for a "digital" sketch that is formed by a plurality of vector-based graphic objects may include definitions for individual vector-based lines and vector-based curves that together form the sketch of individual point locations (e.g., referenced based upon the positional reference system 114). For each individual vector-based line and vector-based curve, the parameters may define one or more 2D points that the lines and/or curves pass through and one or more properties of the paths that connect these 2D points. The properties of the paths may include values for stroke color, stroke shape, stroke thickness, stroke curve, and/or fill for specific sections that are enclosed by one or more lines and/or curves. As another specific but nonlimiting example, a specific modification state for a body of text that is formed by a plurality of alphanumerical text-based graphical objects may exhibit a variety of properties such as definitions for locations for individual text characters, Unicode identifiers for individual text characters, font-size definitions for individual text characters, font-style definitions for individual text characters, and so on.

The modification location data may be defined by reference to the positional reference system 114 to define locations within the digital document 104 at which individual instances of editing activity occur. Thus, upon a specific boundary 206 for a content section 116 being defined, the historical modification data 700 may be analyzed to identify only those graphical objects 112 and corresponding user modifications that reside within the "selected" content section 116. Then, as user input is received in order to control a modification state of the "selected" content section 116 that is rendered by an application, the application can readily identify contents that are located outside of the "selected" content section 116 that are to have their modification state remain unchanged.

The modification time data may be defined by reference to a system clock. For example, each individual time $T_0$ through $T_5$ of FIG. 1 may be defined by reference to a specific time on the clock at which the illustrated versions of the sketches were completed. In such implementations, the techniques described herein may enable users to select a content section 116 by defining a boundary 206 around a subset of graphical objects 112 and then control the rendered modification state of the defined subset by indicating a specific time of interest. As a specific but nonlimiting example, a first user input may be entered by the user manipulating a curser UI control 202 to draw a lasso object around a subset of graphical objects. Then, once the subset is selected, a second user input may be entered to cause the subset of objects to be rendered in accordance with a modification state that existed at a particular time of interest. For example, the user may enter the second user input as an audible command (e.g., voice command) instructing a computing device to "show me the version of this sketch as it existed yesterday at 3 pm."

Additionally, or alternatively, the modification times may be defined as a simple ordered sequence of user modifications. In such implementations, the techniques described herein may enable users to control the rendered modification state of a subset of graphical objects by repeatedly selecting an "Undo Command" and/or a "Redo Command" until a described modification state is rendered. It can be appreciated that an exemplary "Undo Command" is available via the Microsoft® Word® application and is associated with the shortcut "CTRL+Z."

The modification owner data may define which specific users performed which specific user modifications and/or predominantly created specific versions of subsets of graphical objects (e.g., sketches). For example, as illustrated in FIG. 7, the modification owner data indicates that a "User 1" predominantly created the first version of the first sketch (i.e., the small-sized house with a carport on the left side), a "User 2" predominantly created the first version of the second sketch (i.e., the small barn with a carport on the right side) and the second version of the first sketch (i.e., the same small-sized house but with the carport removed). In various implementations, the modification owner data may facilitate a user's ability to instruct an application to render specific edits and/or versions of objects that were entered and/or created by specific users. For example, after having selected a specific content section 116, the user may enter the second user input as an audible command instructing a computing device to "show me the version of this sketch that Susan created yesterday afternoon."

Although aspects of this disclosure are predominantly disclosed in the context of a digital canvas application, the presently disclosed techniques are similarly applicable to word processing applications, spreadsheet applications, computer-aided design ("CAD") applications, slideshow presentation applications, photograph editing applications, and so on. These and other variations shall be considered variations that do not depart from the present disclosure.

Figure 8A:
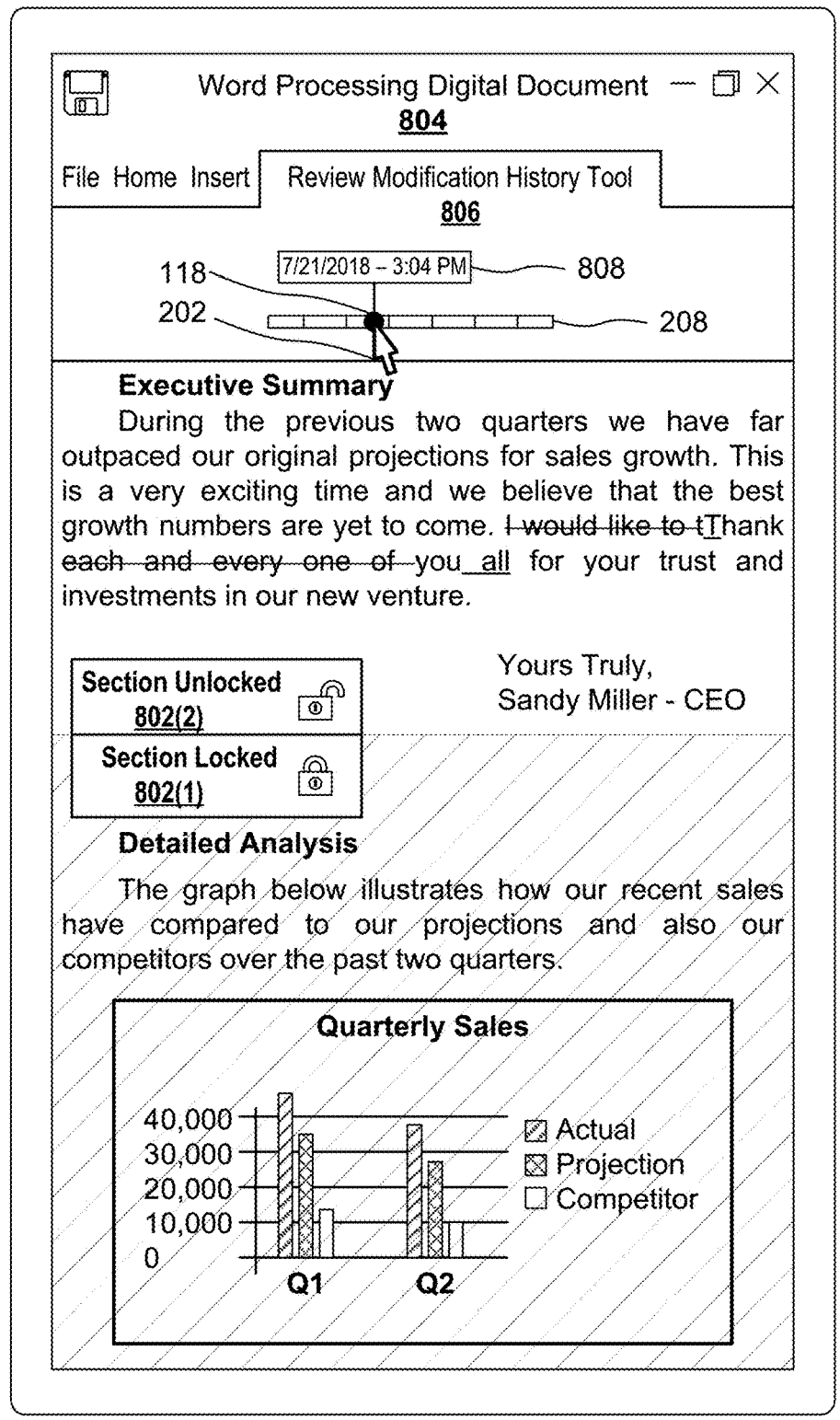
FIG. 8A illustrates an exemplary implementation in which a first section of a word processing digital document is locked (e.g., frozen) while a second section is unlocked with respect to a review modification history tool.

Turning now to FIG. 8A, illustrated is an exemplary implementation in which a first section 802(1) of a word processing digital document 804 is locked (e.g., frozen) while a second section 802(2) is unlocked with respect to a review modification history tool 806. In the illustrated example, the first section 802(1) of the word processing digital document 804 corresponds to a "Detailed Analysis" section and the second section 802(2) of the word processing digital document 804 corresponds to a "Executive Summary" section. To visually indicate that the first section 802(1) is locked, the illustrated implementation includes a hatching pattern rendered over the first section 802(1) along with a "locked padlock" symbol. In contrast, the second section 802(2) includes no such hatching pattern and includes an "unlocked padlock" symbol.

As illustrated, a user may dynamically change a currently rendered modification state of the unlocked section(s) of the word processing digital document 804 by moving a curser UI control 202 to manipulate a position of a UI control 118 with respect to a graphical timeline object 208. In various implementations, an application that is rendering the word processing digital document 804 may be configured to emphasize differences between a most recently saved version of the word processing digital document 804 and the version selected via the UI control 118. For example, as illustrated, a user has manipulated the UI control 118 to cause the application to render a version of the digital document 804 as it existed at 3:04 PM on Jul. 21, 2018. In response, the application is rendering a comparison between the user selected version and the most current version. More specifically, text characters that have since been deleted from the second section 802(2) are shown with strikethrough font formatting whereas text characters that have since been added to the second section 802(2) are shown with underlined font formatting.

Figure 8B:
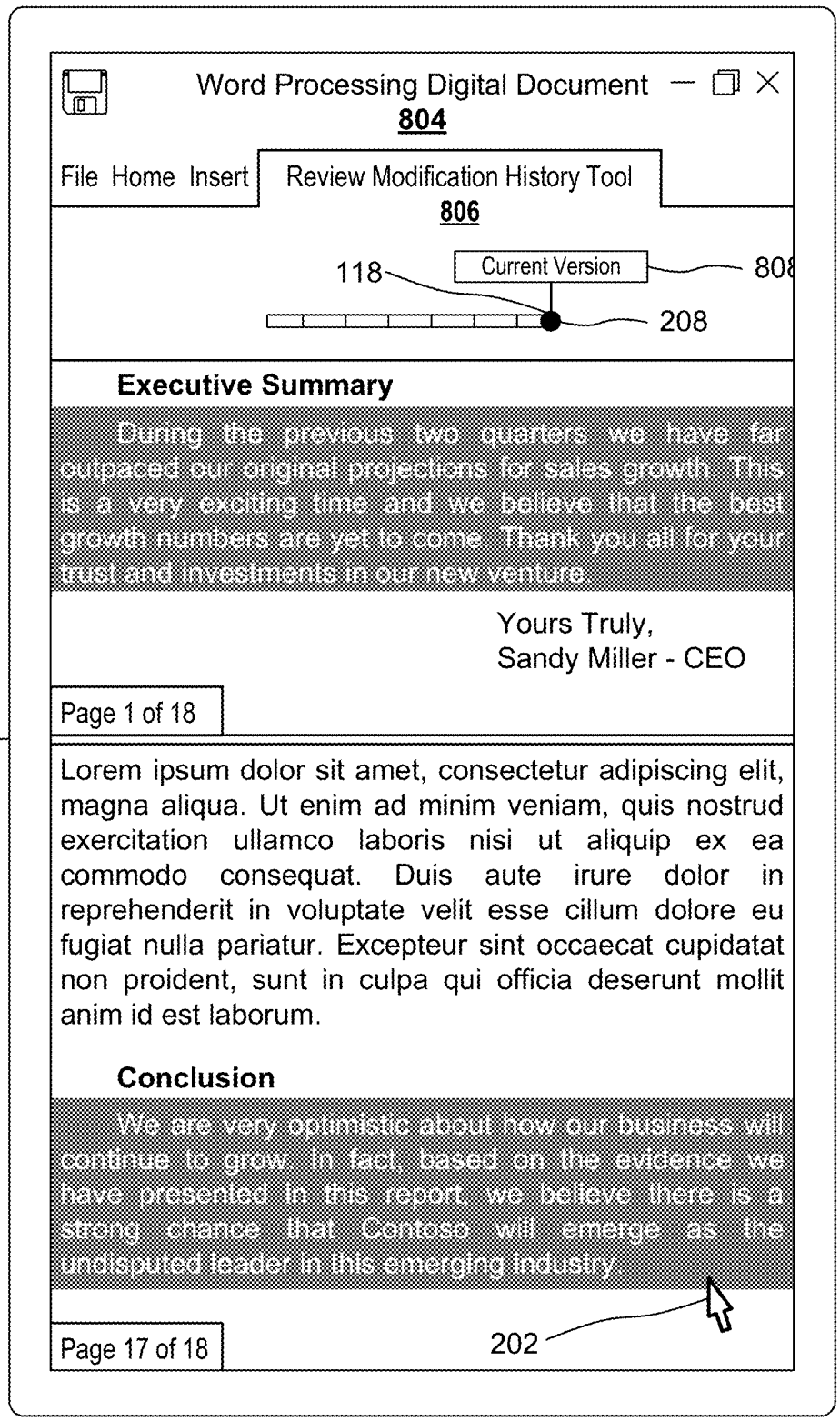

Turning now to FIG. 8B, illustrated is an exemplary implementation that allows a user to select multiple portions of content for the purposes of controlling modification history thereof. In some embodiments, the user may provide one or more user inputs in association with the individual portions to cause the multiple individual portions to be concurrently selected within a file, such as the word processing document. For example, the user may initially highlight a first portion of the word processing digital document 804 and then subsequently highlight a second portion of the word processing digital document 804. This may be done on by instructing an application to display multiple pages or it may be done on a single display that is split to show different sections, e.g., pages or paragraphs, of a file. An example of such functionality is provided in the MICROSOFT WORD application when a user selects multiple portions of a word processing digital document while holding the "CTRL" key on a standard keyboard. For illustrative purposes, the multiple selections are concurrently illustrated via use of a page split feature of the word processing application that enables the user to concurrently view content that is on multiple different discontinuous pages. For example, the user can scroll through pages on the top-split section without affecting the current page being displayed on the bottom-split-section. It can be appreciated that such a feature is functionality is provided in various versions of the MICROSOFT WORD application or other like applications.

In the illustrated embodiment, the multiple portions of the word processing digital document 804 that are selected by the user span across multiple different pages. Specifically, a first portion that is selected in FIG. 8B is on page 1 of 18 whereas a second portion that is selected in FIG. 8B is on page 17 of 18. Thus, it can be appreciated than in various implementations, the multiple selected portions may be contiguous and/or discontinuous. It can further be appreciated that the multiple selected portions may be on the same page or on different pages. Additionally, a single portion that is selected by the user may span across multiple pages.

Figure 8C:
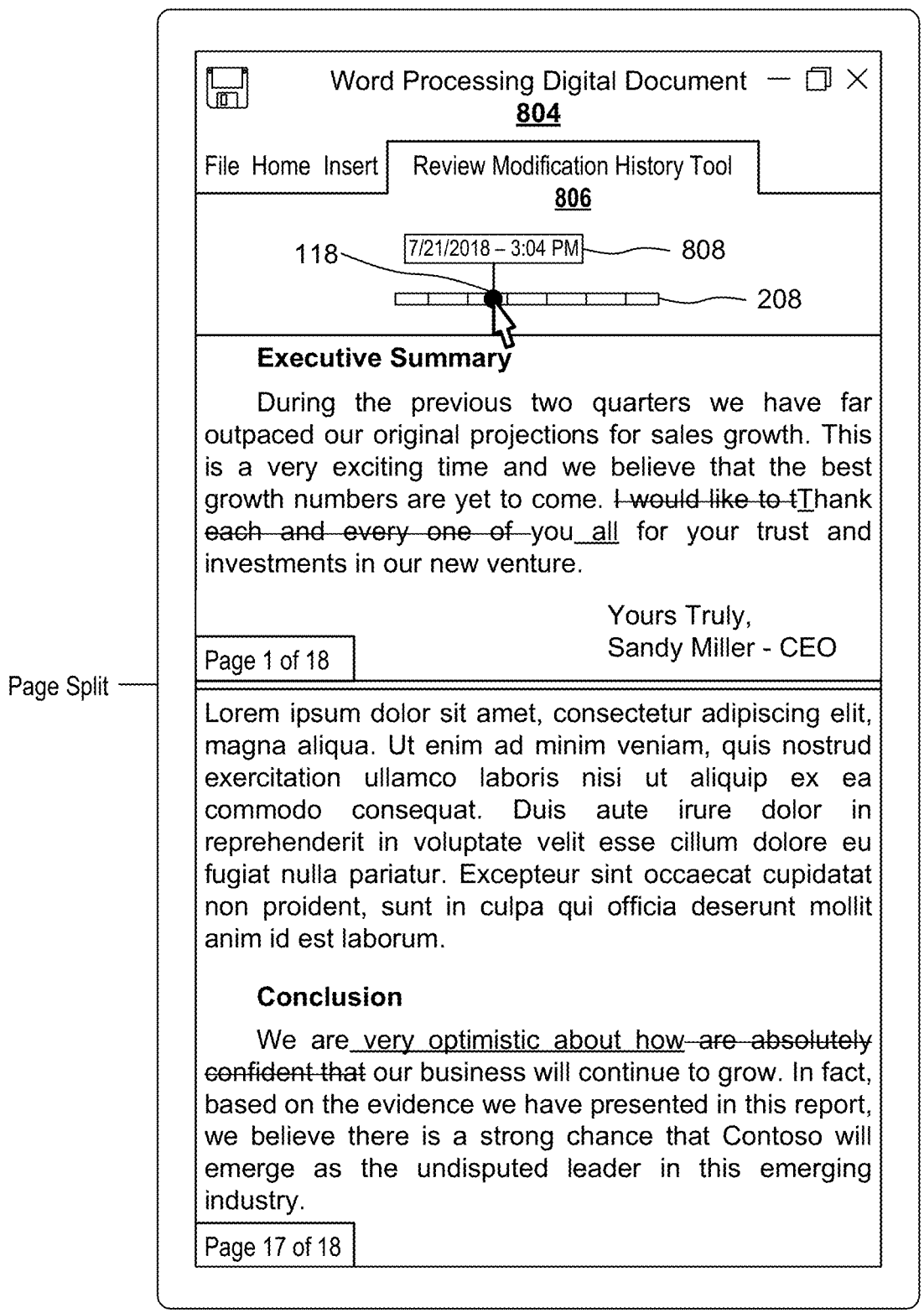
FIG. 8C illustrates a view of the word processing document in which the user has manipulate the UI control to cause the modification state to be altered for only those multiple portions that were selected in FIG. 8B.

Turning now to FIG. 8C, illustrated is a view of the word processing document in which the user has manipulate the UI control 118 to cause the modification state to be concurrently altered for only those multiple portions that were selected in FIG. 8B. As illustrated, the rendered modification state each of the selected portions are being concurrently controlled via a single UI control 118. In an alternative implementation, each of the multiple selected portions may be controlled via a dedicated corresponding UI control. For example, a first UI control may be dedicated to controlling the first selected portion, which includes the Executive Summary whereas a second UI control may be dedicated to controlling the second selected portion, which includes the Conclusion.

Figure 9:
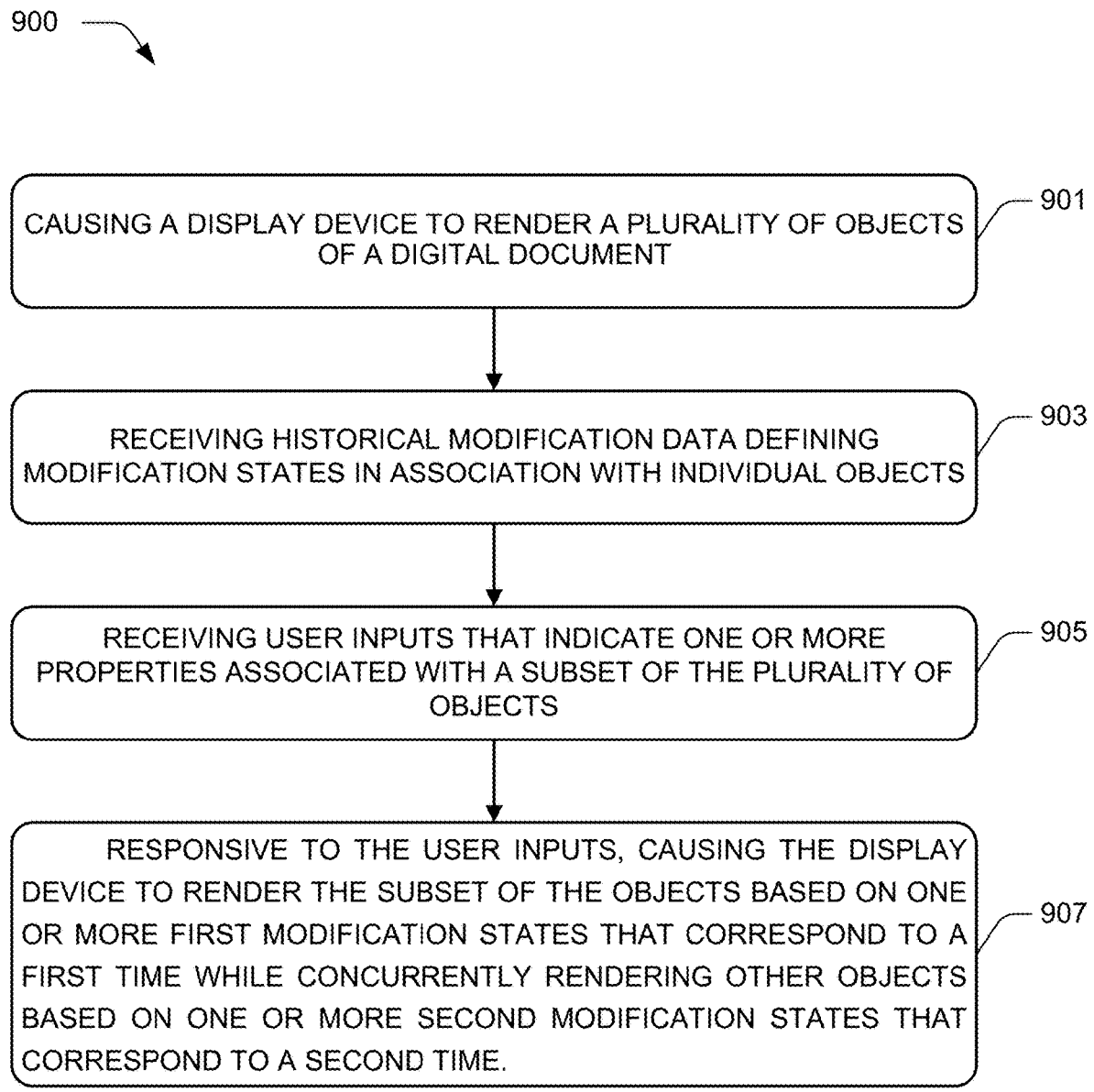
FIG. 9 illustrates an exemplary process for causing a display device to receive user input defining properties for a subset of objects within a digital document and responding to the user input by displaying the subset of objects at a different modification state than other objects within the digital document.

Turning now to FIG. 9, illustrated is an exemplary process for causing a display device to receive user input defining properties for a defined subset of objects within a digital document and in response to the user input to display the defined subset of objects at a different modification state than other objects within the digital document.

At block 901, a computing system may cause a display device to render a plurality of objects of a digital document. The plurality of objects may include, but are not limited to, raster-based graphic objects, vector-based graphic objects, alphanumerical objects, photographic objects, chart objects, and so on. As a specific but nonlimiting example, the plurality of objects may form two or more sketches that are located at two or more different regions of the digital document.

At block 903, the computer system may receive historical modification data that defines modification states in association with individual objects of the digital document at various times during an editing process. For example, as described in relation to FIG. 7, the historical modification data may be defined based on a variety of parameters that are suitable for instructing an application how to graphically render a variety of graphical objects. The historical modification data may also associate specific times with specific modification states.

At block 905, the computer system may receive one or more user inputs that indicate one or more properties associated with a subset of the plurality of objects. As a specific but nonlimiting example, a user may create a boundary around a specific sketch within the digital document. This may enable the computing system to specifically identify the subset as being only those objects which are included within the user-defined boundary. As another specific but nonlimiting example, a user may indicate a shape of interest by, for example, audibly instructing the computing system to identify all generally circular objects for inclusion within the subset. For example, the user may audibly state "Show me all of the circular-shaped objects that were in this document yesterday afternoon." This may enable the computing system to find objects that exhibit these shape properties and time properties for inclusion within the subset.

At block 907, the computer system may respond to the one or more user inputs by causing the display device to render the subset of objects based on a first modification state that corresponds to a first time while concurrently rendering the other objects within the digital document (i.e., those objects that are not part of the subset) based on a second modification state that corresponds to a second time. As a specific but nonlimiting example, the first time may be a time specified in the user input received at block 905 whereas the second time may correspond to a most up-to-date (e.g., current) modification state of the digital document. Thus, continuing with the example where the user audibly recited "Show me all of the circular-shaped objects that were in this document yesterday afternoon," the computing system may respond by analyzing the historical modification data to identify a subset of objects that were generally circular in shape and that were being rendered at the specified time (i.e., yesterday afternoon). Then, the computing system may further respond by reverting the subset of objects back to the specified time without altering the rendered modification state of other objects that are not included within the subset of objects having the user specified properties.

Figure 10:
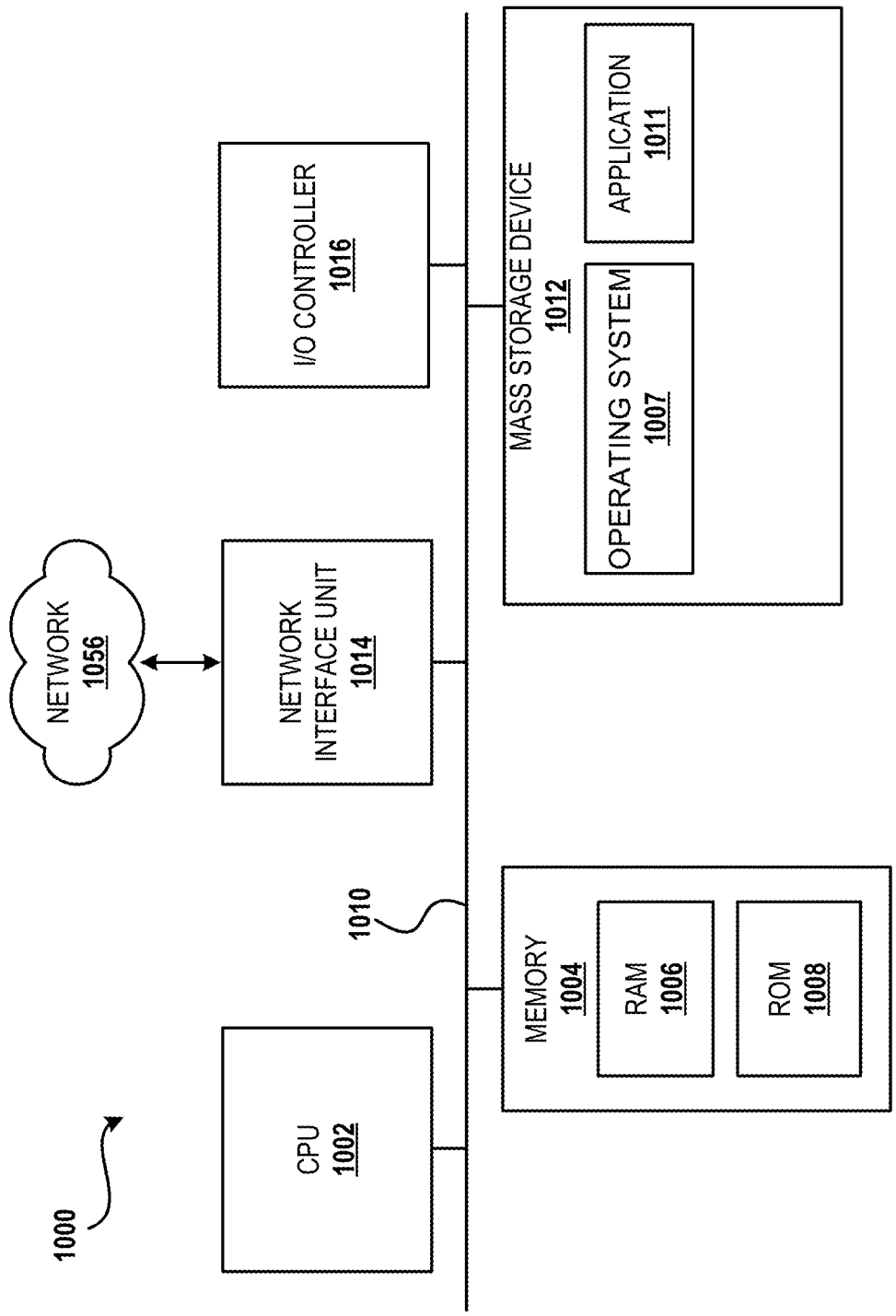
FIG. 10 is a computer architecture diagram illustrating an illustrative computer hardware and software architecture for a computing system capable of implementing aspects of the techniques and technologies presented herein.

FIG. 10 shows additional details of an example computer architecture 1000 for a computer capable of executing the program components described herein. The computer architecture 1000 illustrated in FIG. 10 illustrates an architecture for a server computer, a mobile phone, a PDA, a smart phone, a desktop computer, a netbook computer, a tablet computer, and/or a laptop computer. The computer architecture 1000 may be utilized to execute any aspects of the software components presented herein.

The computer architecture 1000 illustrated in FIG. 10 includes a central processing unit 1002 ("CPU"), a system memory 1004, including a random-access memory 1006 ("RAM") and a read-only memory ("ROM") 1008, and a system bus 1010 that couples the memory 1004 to the CPU 1002. A basic input/output system containing the basic routines that help to transfer information between elements within the computer architecture 1000, such as during startup, is stored in the ROM 1008. The computer architecture 1000 further includes a mass storage device 1012 for storing an operating system 1007, one or more application programs 1011, such as the digital canvas application, word processing application, spreadsheet application, computer-aided design ("CAD") application, slideshow presentation application, photograph editing application, and so on.

The mass storage device 1012 is connected to the CPU 1002 through a mass storage controller (not shown) connected to the bus 1010. The mass storage device 1012 and its associated computer-readable media provide non-volatile storage for the computer architecture 1000. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 1000.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information, and which can be accessed by the computer architecture 1000. For purposes of the claims, the phrase "computer storage medium," "computer-readable storage medium" and variations thereof, does not include waves, signals, and/or other transitory and/or intangible communication media, per se.

According to various configurations, the computer architecture 1000 may operate in a networked environment using logical connections to remote computers through the network 1056 and/or another network (not shown in FIG. 10). The computer architecture 1000 may connect to the network 1056 through a network interface unit 1014 connected to the bus 1010. It should be appreciated that the network interface unit 1014 also may be utilized to connect to other types of networks and remote computer systems. The computer architecture 1000 also may include an input/output controller 1016 for receiving and processing input from a number of other devices, including a keyboard, mouse, or electronic stylus (also not shown in FIG. 10). Similarly, the input/output controller 1016 may provide output to a display screen, a printer, or other type of output device (also not shown in FIG. 10).

It should be appreciated that the software components described herein may, when loaded into the CPU 1002 and executed, transform the CPU 1002 and the overall computer architecture 1000 from a general-purpose computing system into a special-purpose computing system customized to facilitate the functionality presented herein. The CPU 1002 may be constructed from any number of transistors or other discrete circuit elements, which may individually or collectively assume any number of states. More specifically, the CPU 1002 may operate as a finite-state machine, in response to executable instructions contained within the software modules disclosed herein. These computer-executable instructions may transform the CPU 1002 by specifying how the CPU 1002 transitions between states, thereby transforming the transistors or other discrete hardware elements constituting the CPU 1002.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 1000 in order to store and execute the software components presented herein. It also should be appreciated that the computer architecture 1000 may include other types of computing devices, including hand-held computers, embedded computer systems, personal digital assistants, and other types of computing devices known to those skilled in the art. It is also contemplated that the computer architecture 1000 may not include all of the components shown in FIG. 10, may include other components that are not explicitly shown in FIG. 10, or may utilize an architecture completely different than that shown in FIG. 10.

Figure 11:
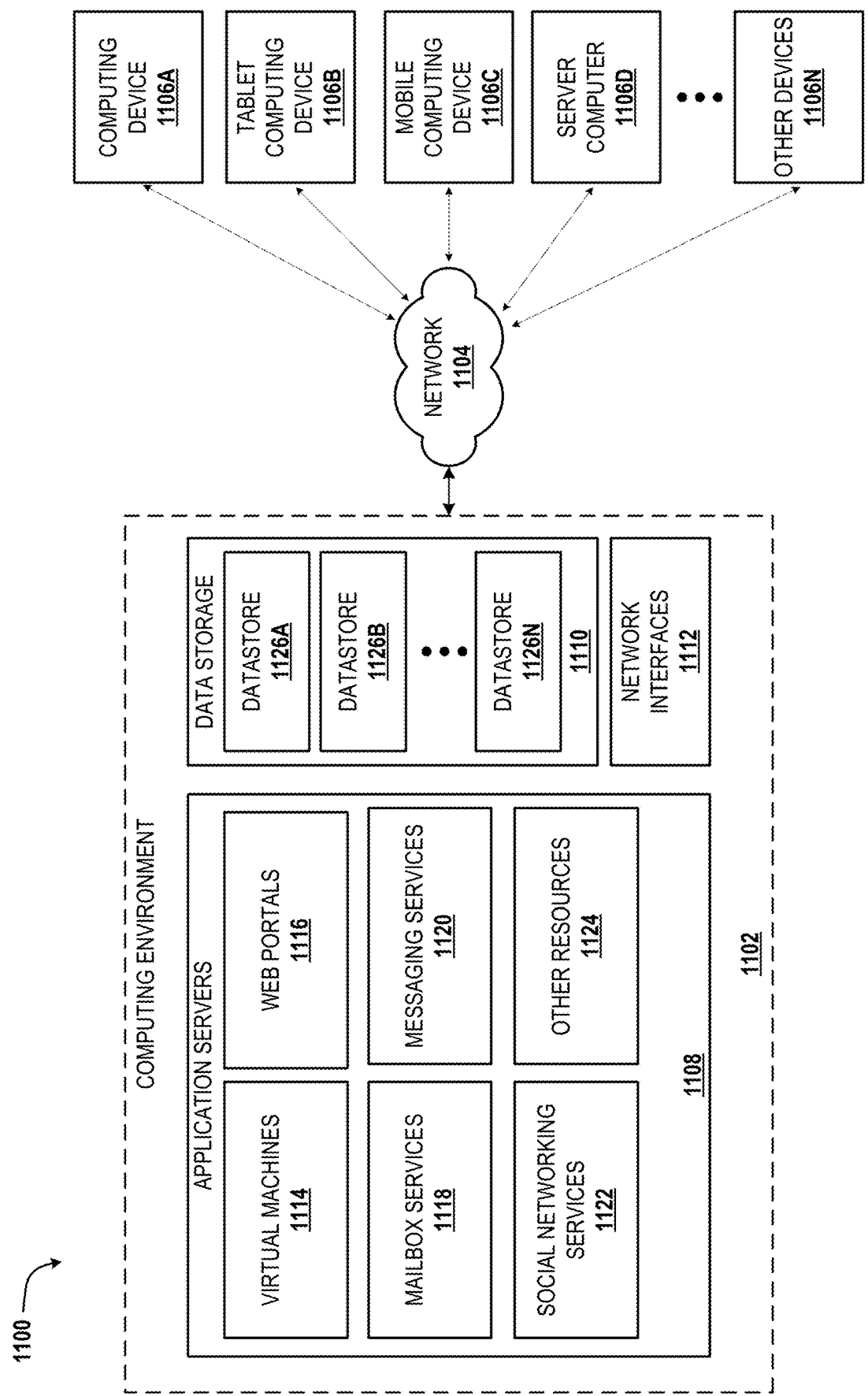
FIG. 11 is a diagram illustrating a distributed computing environment capable of implementing aspects of the techniques and technologies presented herein.

FIG. 11 depicts an illustrative distributed computing environment 1100 capable of executing the software components described herein. Thus, the distributed computing environment 1100 illustrated in FIG. 11 can be utilized to execute any aspects of the software components presented herein. For example, the distributed computing environment 1100 can be utilized to execute aspects of the software components described herein.

According to various implementations, the distributed computing environment 1100 includes a computing environment 1102 operating on, in communication with, or as part of the network 1104. The network 1104 may be or may include the network 1056, described above with reference to FIG. 10. The network 1104 also can include various access networks. One or more client devices 1106A-1106N (hereinafter referred to collectively and/or generically as "clients 1106" and also referred to herein as computing devices 1106) can communicate with the computing environment 1102 via the network 1104 and/or other connections (not illustrated in FIG. 11). In one illustrated configuration, the clients 1106 include a computing device 1106A such as a laptop computer, a desktop computer, or other computing device; a slate or tablet computing device ("tablet computing device") 1106B; a mobile computing device 1106C such as a mobile telephone, a smart phone, or other mobile computing device; a server computer 1106D; and/or other devices 1106N. It should be understood that any number of clients 1106 can communicate with the computing environment 1102. Two example computing architectures for the clients 1106 are illustrated and described herein. It should be understood that the illustrated clients 1106 and computing architectures illustrated and described herein are illustrative and should not be construed as being limited in any way.

In the illustrated configuration, the computing environment 1102 includes application servers 1108, data storage 1110, and one or more network interfaces 1112. According to various implementations, the functionality of the application servers 1108 can be provided by one or more server computers that are executing as part of, or in communication with, the network 1104. The application servers 1108 can host various services, virtual machines, portals, and/or other resources. In the illustrated configuration, the application servers 1108 host one or more virtual machines 1114 for hosting applications or other functionality. According to various implementations, the virtual machines 1114 host one or more applications and/or software modules for enabling aspects of the present disclosure. It should be understood that this configuration is illustrative and should not be construed as being limiting in any way. The application servers 1108 also host or provide access to one or more portals, link pages, Web sites, and/or other information ("web portals") 1116.

According to various implementations, the application servers 1108 also include one or more mailbox services 1118 and one or more messaging services 1120. The mailbox services 1118 can include electronic mail ("email") services. The mailbox services 1118 also can include various personal information management ("PIM") and presence services including, but not limited to, calendar services, contact management services, collaboration services, and/or other services. The messaging services 1120 can include, but are not limited to, instant messaging services, chat services, forum services, and/or other communication services.

The application servers 1108 also may include one or more social networking services 1122. The social networking services 1122 can include various social networking services including, but not limited to, services for sharing or posting status updates, instant messages, links, photos, videos, and/or other information; services for commenting or displaying interest in articles, products, blogs, or other resources; and/or other services. In some configurations, the social networking services 1122 are provided by or include the FACEBOOK social networking service, the LINKEDIN professional networking service, the MYSPACE social networking service, the FOURSQUARE geographic networking service, the YAMMER office colleague networking service, and the like. In other configurations, the social networking services 1122 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 1122 also can include commenting, blogging, and/or micro blogging services. Examples of such services include, but are not limited to, the YELP commenting service, the TWITTER messaging service, and/or other services. It should be appreciated that the above lists of services are not exhaustive and that numerous additional and/or alternative social networking services 1122 are not mentioned herein for the sake of brevity. As such, the above configurations are illustrative, and should not be construed as being limited in any way. According to various implementations, the social networking services 1122 may host one or more applications and/or software modules for providing the functionality described herein. For instance, any one of the application servers 1108 may communicate or facilitate the functionality and features described herein. For instance, a social networking application, mail client, messaging client or a browser running on a phone or any other client 1106 may communicate with a social networking service 1122 and facilitate the functionality, even in part, described above with respect to FIG. 11. Any device or service depicted herein can be used as a resource for supplemental data, including email servers, storage servers, etc.

As shown in FIG. 11, the application servers 1108 also can host other services, applications, portals, and/or other resources ("other resources") 1124. The other resources 1124 can include, but are not limited to, document sharing, rendering or any other functionality. It thus can be appreciated that the computing environment 1102 can provide integration of the concepts and technologies disclosed herein with various mailbox, messaging, social networking, and/or other services or resources.

As mentioned above, the computing environment 1102 can include the data storage 1110. According to various implementations, the functionality of the data storage 1110 is provided by one or more databases operating on, or in communication with, the network 1104. The functionality of the data storage 1110 also can be provided by one or more server computers configured to host data for the computing environment 1102. The data storage 1110 can include, host, or provide one or more real or virtual datastores 1126A-1126N (hereinafter referred to collectively and/or generically as "datastores 1126"). The datastores 1126 are configured to host data used or created by the application servers 1108 and/or other data. Although not illustrated in FIG. 11, the datastores 1126 also can host or store web page documents, word documents, presentation documents, data structures, algorithms for execution by a recommendation engine, and/or other data utilized by any application program or another module. Aspects of the datastores 1126 may be associated with a service for storing files.

The computing environment 1102 can communicate with, or be accessed by, the network interfaces 1112. The network interfaces 1112 can include various types of network hardware and software for supporting communications between two or more computing devices including, but not limited to, the computing devices and the servers. It should be appreciated that the network interfaces 1112 also may be utilized to connect to other types of networks and/or computer systems.

It should be understood that the distributed computing environment 1100 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 1100 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 1100 to utilize the functionality described herein for providing the techniques disclosed herein, among other aspects. In one specific example, as summarized above, techniques described herein may be implemented, at least in part, by web browser application, which works in conjunction with the application servers 1108 of FIG. 11.

Figure 12:
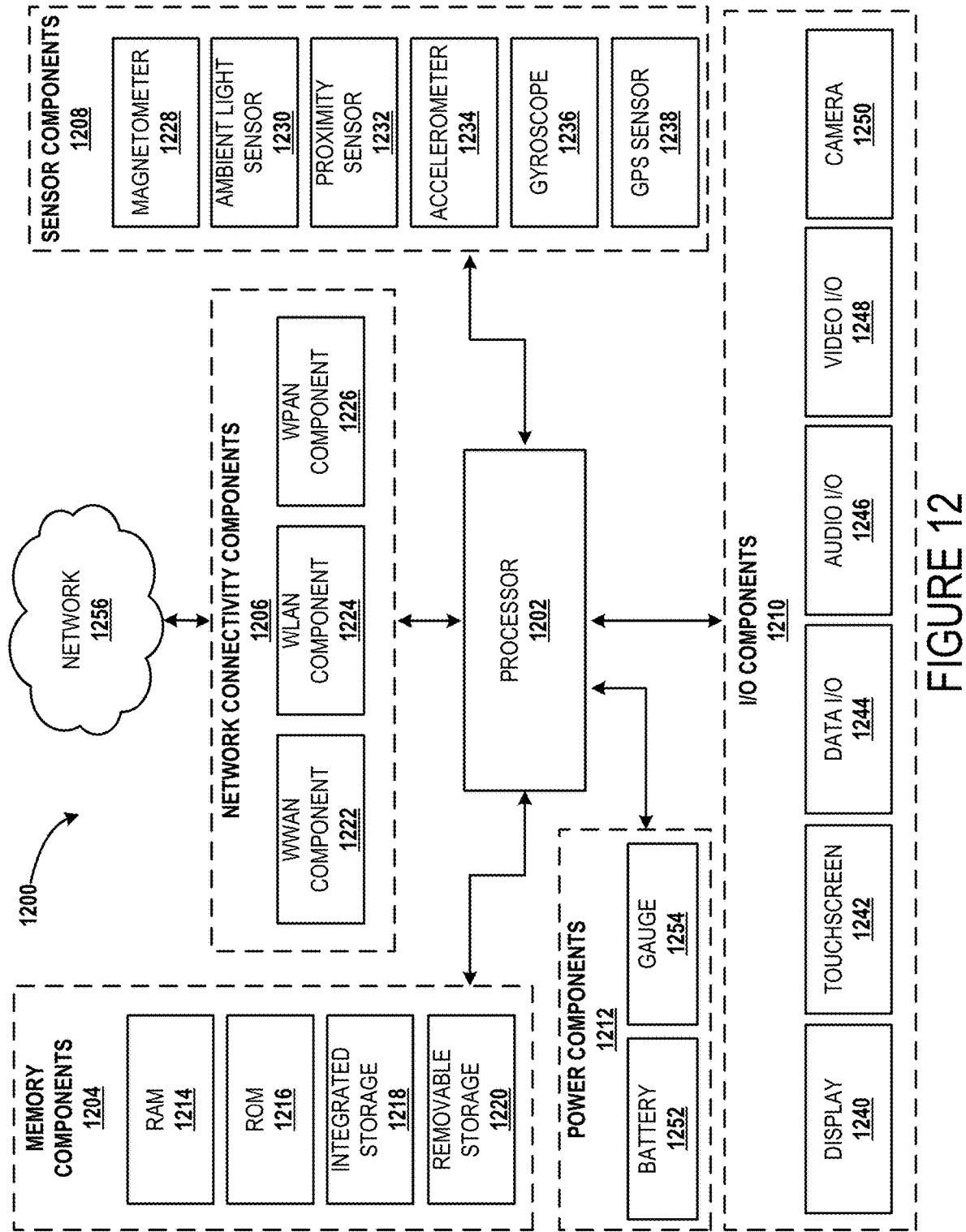
FIG. 12 is a computer architecture diagram illustrating another computing device architecture for a computing device capable of implementing aspects of the techniques and technologies presented herein.

Turning now to FIG. 12, an illustrative computing device architecture 1200 for a computing device that is capable of executing various software components described herein for enabling aspects of the present disclosure. The computing device architecture 1200 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like. The computing device architecture 1200 is applicable to any of the computing devices shown in FIG. 1 and FIG. 11. Moreover, aspects of the computing device architecture 1200 may be applicable to traditional desktop computers, portable computers (e.g., phones, laptops, notebooks, ultra-portables, and netbooks), server computers, and other computer systems, such as described herein with reference to FIG. 1 and FIG. 7. For example, the single touch and multi-touch aspects disclosed herein below may be applied to desktop computers that utilize a touchscreen or some other touch-enabled device, such as a touch-enabled track pad or touch-enabled mouse.

The computing device architecture 1200 illustrated in FIG. 12 includes a processor 1202, memory components 1204, network connectivity components 1206, sensor components 1208, input/output components 1210, and power components 1212. In the illustrated configuration, the processor 1202 is in communication with the memory components 1204, the network connectivity components 1206, the sensor components 1208, the input/output ("I/O") components 1210, and the power components 1212. Although no connections are shown between the individual components illustrated in FIG. 12, the components can interact to carry out device functions. In some configurations, the components are arranged so as to communicate via one or more busses (not shown in FIG. 12).

The processor 1202 includes a CPU configured to process data, execute computer-executable instructions of one or more application programs, and communicate with other components of the computing device architecture 1200 in order to perform various functionality described herein. The processor 1202 may be utilized to execute aspects of the software components presented herein and, particularly, those that utilize, at least in part, a touch-enabled input.

In some configurations, the processor 1202 includes a graphics processing unit ("GPU") configured to accelerate operations performed by the CPU, including, but not limited to, operations performed by executing general-purpose scientific and/or engineering computing applications, as well as graphics-intensive computing applications such as high-resolution video (e.g., 720P, 1280P, and higher resolution), video games, 3D modeling applications, and the like. In some configurations, the processor 1202 is configured to communicate with a discrete GPU (also not shown in FIG. 12). In any case, the CPU and GPU may be configured in accordance with a co-processing CPU/GPU computing model, wherein the sequential part of an application executes on the CPU and the computationally-intensive part is accelerated by the GPU.

In some configurations, the processor 1202 is, or is included in, a system-on-chip ("SoC") along with one or more of the other components described herein below. For example, the SoC may include the processor 1202, a GPU, one or more of the network connectivity components 1206, and one or more of the sensor components 1208. In some configurations, the processor 1202 is fabricated, in part, utilizing a package-on-package ("PoP") integrated circuit packaging technique. The processor 1202 may be a single core or multi-core processor.

The processor 1202 may be created in accordance with an ARM architecture, available for license from ARM HOLDINGS of Cambridge, United Kingdom. Alternatively, the processor 1202 may be created in accordance with an x86 architecture, such as is available from INTEL CORPORATION of Mountain View, Calif. and others. In some configurations, the processor 1202 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 1204 include a RAM 1214, a ROM 1216, an integrated storage memory ("integrated storage") 1218, and a removable storage memory ("removable storage") 1220. In some configurations, the RAM 1214 or a portion thereof, the ROM 1216 or a portion thereof, and/or some combination of the RAM 1214 and the ROM 1216 is integrated in the processor 1202. In some configurations, the ROM 1216 is configured to store a firmware, an operating system or a portion thereof (e.g., operating system kernel), and/or a bootloader to load an operating system kernel from the integrated storage 1218 and/or the removable storage 1220.

The integrated storage 1218 can include a solid-state memory, a hard disk, or a combination of solid-state memory and a hard disk. The integrated storage 1218 may be soldered or otherwise connected to a logic board upon which the processor 1202 and other components described herein also may be connected. As such, the integrated storage 1218 is integrated in the computing device. The integrated storage 1218 is configured to store an operating system or portions thereof, application programs, data, and other software components described herein.

The removable storage 1220 can include a solid-state memory, a hard disk, or a combination of solid-state memory and a hard disk. In some configurations, the removable storage 1220 is provided in lieu of the integrated storage 1218. In other configurations, the removable storage 1220 is provided as additional optional storage. In some configurations, the removable storage 1220 is logically combined with the integrated storage 1218 such that the total available storage is made available as a total combined storage capacity. In some configurations, the total combined capacity of the integrated storage 1218 and the removable storage 1220 is shown to a user instead of separate storage capacities for the integrated storage 1218 and the removable storage 1220.

The removable storage 1220 is configured to be inserted into a removable storage memory slot (not shown in FIG. 12) or other mechanism by which the removable storage 1220 is inserted and secured to facilitate a connection over which the removable storage 1220 can communicate with other components of the computing device, such as the processor 1202. The removable storage 1220 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 1204 can store an operating system. According to various configurations, the operating system includes, but is not limited to IOS from Apple Inc. of Cupertino, Calif., and ANDROID OS from Google Inc. of Mountain View, Calif. Other operating systems are contemplated.

The network connectivity components 1206 include a wireless wide area network component ("WWAN component") 1222, a wireless local area network component ("WLAN component") 1224, and a wireless personal area network component ("WPAN component") 1226. The network connectivity components 1206 facilitate communications to and from the network 1256 or another network, which may be a WWAN, a WLAN, or a WPAN. Although only the network 1256 is illustrated, the network connectivity components 1206 may facilitate simultaneous communication with multiple networks, including the network 1104 of FIG. 11. For example, the network connectivity components 1206 may facilitate simultaneous communications with multiple networks via one or more of a WWAN, a WLAN, or a WPAN.

The network 1256 may be or may include a WWAN, such as a mobile telecommunications network utilizing one or more mobile telecommunications technologies to provide voice and/or data services to a computing device utilizing the computing device architecture 1200 via the WWAN component 1222. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 1256 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 1256 may be configured to provide voice and/or data communications with any combination of the above technologies. The network 1256 may be configured to or adapted to provide voice and/or data communications in accordance with future generation technologies.

In some configurations, the WWAN component 1222 is configured to provide dual-multi-mode connectivity to the network 1056. For example, the WWAN component 1222 may be configured to provide connectivity to the network 1256, wherein the network 1256 provides service via GSM and UMTS technologies, or via some other combination of technologies. Alternatively, multiple WWAN components 1222 may be utilized to perform such functionality, and/or provide additional functionality to support other non-compatible technologies (i.e., incapable of being supported by a single WWAN component). The WWAN component 1222 may facilitate similar connectivity to multiple networks (e.g., a UMTS network and an LTE network).

The network 1256 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 1224 is configured to connect to the network 1256 via the WI-FI access points. Such connections may be secured via various encryption technologies including, but not limited, WI-FI Protected Access ("WPA"), WPA2, Wired Equivalent Privacy ("WEP"), and the like.

The network 1256 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 1226 is configured to facilitate communications with other devices, such as peripherals, computers, or other computing devices via the WPAN.

The sensor components 1208 include a magnetometer 1228, an ambient light sensor 1230, a proximity sensor 1232, an accelerometer 1234, a gyroscope 1236, and a Global Positioning System sensor ("GPS sensor") 1238. It is contemplated that other sensors, such as, but not limited to, temperature sensors or shock detection sensors, also may be incorporated in the computing device architecture 1200.

The magnetometer 1228 is configured to measure the strength and direction of a magnetic field. In some configurations the magnetometer 1228 provides measurements to a compass application program stored within one of the memory components 1204 in order to provide a user with accurate directions in a frame of reference including the cardinal directions, north, south, east, and west. Similar measurements may be provided to a navigation application program that includes a compass component. Other uses of measurements obtained by the magnetometer 1228 are contemplated.

The ambient light sensor 1230 is configured to measure ambient light. In some configurations, the ambient light sensor 1230 provides measurements to an application program stored within one the memory components 1204 in order to automatically adjust the brightness of a display (described below) to compensate for low-light and high-light environments. Other uses of measurements obtained by the ambient light sensor 1230 are contemplated.

The proximity sensor 1232 is configured to detect the presence of an object or thing in proximity to the computing device without direct contact. In some configurations, the proximity sensor 1232 detects the presence of a user's body (e.g., the user's face) and provides this information to an application program stored within one of the memory components 1204 that utilizes the proximity information to enable or disable some functionality of the computing device. For example, a telephone application program may automatically disable a touchscreen (described below) in response to receiving the proximity information so that the user's face does not inadvertently end a call or enable/ disable other functionality within the telephone application program during the call. Other uses of proximity as detected by the proximity sensor 1232 are contemplated.

The accelerometer 1234 is configured to measure proper acceleration. In some configurations, output from the accelerometer 1234 is used by an application program as an input mechanism to control some functionality of the application program. For example, the application program may be a video game in which a character, a portion thereof, or an object is moved or otherwise manipulated in response to input received via the accelerometer 1234. In some configurations, output from the accelerometer 1234 is provided to an application program for use in switching between landscape and portrait modes, calculating coordinate acceleration, or detecting a fall. Other uses of the accelerometer 1234 are contemplated.

The gyroscope 1236 is configured to measure and maintain orientation. In some configurations, output from the gyroscope 1236 is used by an application program as an input mechanism to control some functionality of the application program. For example, the gyroscope 1236 can be used for accurate recognition of movement within a 3D environment of a video game application or some other application. In some configurations, an application program utilizes output from the gyroscope 1236 and the accelerometer 1234 to enhance control of some functionality of the application program. Other uses of the gyroscope 1236 are contemplated.

The GPS sensor 1238 is configured to receive signals from GPS satellites for use in calculating a location. The location calculated by the GPS sensor 1238 may be used by any application program that requires or benefits from location information. For example, the location calculated by the GPS sensor 1238 may be used with a navigation application program to provide directions from the location to a destination or directions from the destination to the location. Moreover, the GPS sensor 1238 may be used to provide location information to an external location-based service, such as E911 service. The GPS sensor 1238 may obtain location information generated via WI-FI, WIMAX, and/or cellular triangulation techniques utilizing one or more of the network connectivity components 1206 to aid the GPS sensor 1238 in obtaining a location fix. The GPS sensor 1238 may also be used in Assisted GPS ("A-GPS") systems. The GPS sensor 1238 can also operate in conjunction with other components, such as the processor 1202, to generate positioning data for the computing device 1200.

The I/O components 1210 include a display 1240, a touchscreen 1242, a data I/O interface component ("data I/O") 1244, an audio I/O interface component ("audio I/O") 1246, a video I/O interface component ("video I/O") 1248, and a camera 1250. In some configurations, the display 1240 and the touchscreen 1242 are combined. In some configurations two or more of the data I/O component 1244, the audio I/O component 1246, and the video I/O component 1248 are combined. The I/O components 1210 may include discrete processors configured to support the various interfaces described below or may include processing functionality built-in to the processor 1202.

The display 1240 is an output device configured to present information in a visual form. In particular, the display 1240 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 1240 is a liquid crystal display ("LCD") utilizing any active or passive matrix technology and any backlighting technology (if used). In some configurations, the display 1240 is an organic light emitting diode ("OLED") display. Other display types are contemplated.

The touchscreen 1242, also referred to herein as a "touch-enabled screen," is an input device configured to detect the presence and location of a touch. The touchscreen 1242 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 1242 is incorporated on top of the display 1240 as a transparent layer to enable a user to use one or more touches to interact with objects or other information presented on the display 1240. In other configurations, the touchscreen 1242 is a touch pad incorporated on a surface of the computing device that does not include the display 1240. For example, the computing device may have a touchscreen incorporated on top of the display 1240 and a touch pad on a surface opposite the display 1240.

In some configurations, the touchscreen 1242 is a single-touch touchscreen. In other configurations, the touchscreen 1242 is a multi-touch touchscreen. In some configurations, the touchscreen 1242 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 1242. As such, a developer may create gestures that are specific to a particular application program.

In some configurations, the touchscreen 1242 supports a tap gesture in which a user taps the touchscreen 1242 once on an item presented on the display 1240. The tap gesture may be used for various reasons including, but not limited to, opening or launching whatever the user taps. In some configurations, the touchscreen 1242 supports a double tap gesture in which a user taps the touchscreen 1242 twice on an item presented on the display 1240. The double tap gesture may be used for various reasons including, but not limited to, zooming in or zooming out in stages. In some configurations, the touchscreen 1242 supports a tap and hold gesture in which a user taps the touchscreen 1242 and maintains contact for at least a pre-defined time. The tap and hold gesture may be used for various reasons including, but not limited to, opening a context-specific menu.

In some configurations, the touchscreen 1242 supports a pan gesture in which a user places a finger on the touchscreen 1242 and maintains contact with the touchscreen 1242 while moving the finger on the touchscreen 1242. The pan gesture may be used for various reasons including, but not limited to, moving through screens, images, or menus at a controlled rate. Multiple finger pan gestures are also contemplated. In some configurations, the touchscreen 1242 supports a flick gesture in which a user swipes a finger in the direction the user wants the screen to move. The flick gesture may be used for various reasons including, but not limited to, scrolling horizontally or vertically through menus or pages. In some configurations, the touchscreen 1242 supports a pinch and stretch gesture in which a user makes a pinching motion with two fingers (e.g., thumb and forefinger) on the touchscreen 1242 or moves the two fingers apart.

The pinch and stretch gesture may be used for various reasons including, but not limited to, zooming gradually in or out of a web site, map, or picture.

Although the above gestures have been described with reference to the use of one or more fingers for performing the gestures, other appendages such as toes or objects such as styluses may be used to interact with the touchscreen 1242. As such, the above gestures should be understood as being illustrative and should not be construed as being limiting in any way.

The data I/O interface component 1244 is configured to facilitate input of data to the computing device and output of data from the computing device. In some configurations, the data I/O interface component 1244 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 1246 is configured to provide audio input and/or output capabilities to the computing device. In some configurations, the audio I/O interface component 1246 includes a microphone configured to collect audio signals. In some configurations, the audio I/O interface component 1246 includes a headphone jack configured to provide connectivity for headphones or other external speakers. In some configurations, the audio I/O interface component 1246 includes a speaker for the output of audio signals. In some configurations, the audio I/O interface component 1246 includes an optical audio cable out.

The video I/O interface component 1248 is configured to provide video input and/or output capabilities to the computing device. In some configurations, the video I/O interface component 1248 includes a video connector configured to receive video as input from another device (e.g., a video media player such as a DVD or BLURAY player) or send video as output to another device (e.g., a monitor, a television, or some other external display). In some configurations, the video I/O interface component 1248 includes a High-Definition Multimedia Interface ("HDMI"), mini-HDMI, micro-HDMI, DisplayPort, or proprietary connector to input/output video content. In some configurations, the video I/O interface component 1248 or portions thereof is combined with the audio I/O interface component 1246 or portions thereof.

The camera 1250 can be configured to capture still images and/or video. The camera 1250 may utilize a charge coupled device ("CCD") or a complementary metal oxide semiconductor ("CMOS") image sensor to capture images. In some configurations, the camera 1250 includes a flash to aid in taking pictures in low-light environments. Settings for the camera 1250 may be implemented as hardware or software buttons.

Although not illustrated, one or more hardware buttons may also be included in the computing device architecture 1200. The hardware buttons may be used for controlling some operational aspect of the computing device. The hardware buttons may be dedicated buttons or multi-use buttons. The hardware buttons may be mechanical or sensor-based.

The illustrated power components 1212 include one or more batteries 1252, which can be connected to a battery gauge 1254. The batteries 1252 may be rechargeable or disposable. Rechargeable battery types include, but are not limited to, lithium polymer, lithium ion, nickel cadmium, and nickel metal hydride. Each of the batteries 1252 may be made of one or more cells.

The battery gauge 1254 can be configured to measure battery parameters such as current, voltage, and temperature. In some configurations, the battery gauge 1254 is configured to measure the effect of a battery's discharge rate, temperature, age and other factors to predict remaining life within a certain percentage of error. In some configurations, the battery gauge 1254 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 1212 may also include a power connector, which may be combined with one or more of the aforementioned I/O components 1210. The power components 1212 may interface with an external power system or charging equipment via an I/O component.

Example Clauses

Example Clause A, a computer-implemented method, comprising: causing a display device to render a plurality of objects of a digital document; receiving historical modification data defining modification states for individual objects of the plurality of objects, wherein individual modification states of each object are associated with individual times of a plurality of different times; receiving a first user input that indicates a content section of the digital document; determining a subset of the plurality of objects that is associated with the content section of the digital document, wherein the plurality of objects includes one or more other objects that are excluded from the subset; receiving a second user input that indicates a first time of the plurality of different times; and responsive to the second user input, causing the display device to concurrently render: the subset of the plurality of objects based on one or more first modification states that correspond to the first time, and the one or more other objects that are excluded from the subset based on one or more second modification states that correspond to a second time.

Example Clause B, the computer-implemented method of Example Clause A, further comprising exposing a user input (UI) control in association with the content section to facilitate generation of the second user input.

Example Clause C, the computer-implemented method of any one of Example Clauses A and B, wherein the UI control enables curser input in association with a graphical timeline object to toggle the subset of the plurality of objects from being rendered in accordance with the one or more second modification states that correspond to the second time to being rendered in accordance with the one or more first modification states that correspond to the first time.

Example Clause D, the computer-implemented method of any one of Example Clauses A through C, further comprising causing, responsive to the first user input, the display device to render a histogram in association with the content section.

Example Clause E, the computer-implemented method of any one of Example Clauses A through D, wherein the histogram indicates at least one of: modification activity levels corresponding to the content section at the plurality of different times, or modification activity owners corresponding to the content section at the plurality of different times.

Example Clause F, the computer-implemented method of Example Clauses A through E, further comprising causing, responsive to the second user input, an indication of a modification activity occurring in association with the one or more other objects that are excluded from the subset within a threshold amount of time from the first time.

Example Clause G, the computer-implemented method of Example Clauses A through F, further comprising: receiving a copy instruction in association with the content section of the digital document; responsive to the copy instruction, causing the display device to concurrently render a first instance of the subset of the plurality of objects and a second instance of the subset of the plurality of objects; and responsive to the copy instruction, causing the display device to concurrently render: the first instance of the subset based on the one or more first modification states that correspond to the first time, and the second instance of the subset based on the one or more second modification states that correspond to the second time.

Example Clause H, the computer-implemented method of Example Clauses A through G, wherein the content section corresponds to a two-dimensional area of the digital document or a three-dimensional volume of the digital document.

Example Clause I, the computer-implemented method of Example Clauses A through H, wherein the subset of the plurality of objects are rendered inside of the content section of the digital document, and wherein the one or more other objects are rendered outside of the content section.

Example Clause J, a system, comprising: at least one processor; and memory in communication with the at least one processor, the memory having computer-readable instructions stored thereupon that, when executed by the at least one processor, cause the at least one processor to: receive a digital document that includes historical modification data defining a plurality of modification states corresponding to a plurality of objects; cause a display device to render the plurality of objects based on one or more current modification states; receive a first user input that indicates a content section that includes a subset of the plurality of objects, wherein the plurality of objects includes other objects that are excluded from the subset; based at least in part on the first user input, expose a user input (UI) control in association with the content section to facilitate generation of a second user input that indicates one or more previous modification states corresponding to the plurality of objects; and responsive to the second user input, causing the display device to concurrently render: the subset of the plurality of objects based on one or more previous modification states, and the other objects that are excluded from the subset based on the one or more current modification states.

Example Clause K, the system of Example Clause J, wherein the UI control enables a user to dynamically toggle a rendering of the subset of the plurality of objects between the one or more previous modification states and the one or more current modification states.

Example Clause L, the system of any one of Example Clauses J though K, wherein the computer-readable instructions further cause the at least one processor to: receive modification location data that indicates a plurality of locations within the digital document at which individual objects, of the plurality of objects, have been modified; and responsive to the first user input, determine the subset by analyzing the modification location data with respect to the content section.

Example Clause M the system of any one of Example Clauses J though L, wherein the digital document is a digital canvas document, a word processor document, a spreadsheet document, a computer-aided drafting document, or a slide presentation document.

Example Clause N the system of any one of Example Clauses J though M, wherein the other objects that are excluded from the subset, of the plurality of objects, are a copied instance of the subset of the plurality of objects.

Example Clause O, a computer-implemented method, comprising: causing a display device to render a plurality of objects of a digital document; receiving historical modification data defining modification states in association with individual objects, of the plurality of objects, at a plurality of different times; receiving one or more user inputs that indicate one or more properties associated with a subset of the plurality of objects; responsive to the one or more user inputs, causing the display device to concurrently render: the subset of the plurality of objects based on one or more first modification states that correspond to a first time, and one or more other objects, that are excluded from the subset, based on one or more second modification states that correspond to a second time.

Example Clause P, the computer-implemented method of Example Clause O, wherein the one or more user inputs include at least one audible voice command that indicates the one or more properties.

Example Clause Q, the computer-implemented method of any one of Example Clauses O through P, wherein the one or more user inputs corresponds to a user-defined boundary that at least partially graphically encloses the subset of the plurality of objects.

Example Clause R, the computer-implemented method of any one of Example Clauses O through Q, wherein the historical modification data includes at least modification location data that indicates locations within the digital document at which one or more user modifications have occurred.

Example Clause S, the computer-implemented method of any one of Example Clauses O through R, wherein the one or more properties associated with the subset of the plurality of objects indicate one or more users that have performed user modifications with respect to the subset of the plurality of objects.

Example Clause T, the computer-implemented method of any one of Example Clauses O through S, wherein the one or more user input includes at least a curser input that is received in association with a user input (UI) control to toggle the subset of the plurality of objects from being rendered in accordance with the one or more second modification states to being rendered in accordance with the one or more first modification states.

CONCLUSION

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter. All examples are provided for illustrative purposes and is not to be construed as limiting.

The invention claimed is:

1. A computer-implemented method, comprising:
   causing a display device to render a plurality of objects that are graphically positioned within a digital document in relation to a coordinate reference system of the digital document;
   receiving historical modification data defining modification states for individual objects of the plurality of objects, wherein individual modification states of each object are associated with individual times of a plurality of different times;
   receiving a first user input that defines a content section boundary of the digital document in relation to the coordinate system reference;
   determining, based on the coordinate system reference, a subset of multiple objects, of the plurality of objects, that are enclosed within the content section boundary that is defined in relation to the coordinate system reference, wherein the plurality of objects includes one or more other objects that are excluded from the subset of multiple objects;
   receiving a second user input that selects a selective rollback functionality in association with the content section boundary;
   responsive to the second user input, exposing a user interface (UI) control that facilitates generation of a third user input that prescribes a first time of the plurality of different times in association with the content section boundary; and
   responsive to the third user input, causing the display device to concurrently render:
      the subset multiple objects of the plurality of objects based on one or more first modification states that correspond to the first time, and
      the one or more other objects that are excluded from the subset based on one or more second modification states that correspond to a second time.

2. The computer-implemented method of claim 1, wherein the UI control enables curser input in association with a graphical timeline object to toggle the subset of multiple objects from being rendered in accordance with the one or more second modification states that correspond to the second time to being rendered in accordance with the one or more first modification states that correspond to the first time.

3. The computer-implemented method of claim 1, further comprising causing, responsive to the second user input, the display device to render a histogram in association with the content section boundary that is defined by the first user input.

4. The computer-implemented method of claim 3, wherein the histogram indicates at least one of:
   modification activity levels corresponding to the content section boundary at the plurality of different times, or
   modification activity owners corresponding to the content section boundary at the plurality of different times.

5. The computer-implemented method of claim 1, further comprising causing, responsive to the third user input, an indication of a modification activity occurring in association with the one or more other objects, that are excluded from the subset of multiple objects, within a threshold amount of time from the first time.

6. The computer-implemented method of claim 1, further comprising:
   receiving a copy instruction in association with the content section boundary of the digital document;
   responsive to the copy instruction, causing the display device to concurrently render a first instance of the subset of multiple objects and a second instance of the subset of multiple objects; and
   responsive to the copy instruction, causing the display device to concurrently render:
      the first instance of the subset of multiple objects based on the one or more first modification states that correspond to the first time, and
      the second instance of the subset of multiple objects based on the one or more second modification states that correspond to the second time.

7. The computer-implemented method of claim 1, wherein the content section boundary corresponds to a two-dimensional area of the digital document or a three-dimensional volume of the digital document.

8. The computer-implemented method of claim 1, wherein the subset of multiple objects are rendered inside of the content section boundary of the digital document, and wherein the one or more other objects are rendered outside of the content section boundary.

9. A system, comprising:
   at least one processor; and
   memory in communication with the at least one processor, the memory having computer-readable instructions stored thereupon that, when executed by the at least one processor, cause the at least one processor to:
      receive a digital document that includes historical modification data defining a plurality of modification states corresponding to a plurality of objects that are positioned in relation to a coordinate system reference of the digital document;
      cause a display device to render the plurality of objects based on one or more current modification states;
      receive a first user input that defines a content section boundary that encloses a subset of multiple objects of the plurality of objects, wherein the plurality of objects includes other objects that are not enclosed by the content section boundary;
      determine, based on the first user input, the subset of multiple objects that are enclosed within the content section boundary that is defined in relation to the coordinate system reference;
      receive a second user input that selects a selective rollback functionality in association with the content section boundary;
      based at least in part on the second user input, expose a user input (UI) control in association with the content section boundary to facilitate generation of a third user input that indicates one or more previous modification states; and
      responsive to the third user input, causing the display device to concurrently render:
         the subset of multiple objects based on the one or more previous modification states, and
         the other objects that are not enclosed by the content section boundary based on the one or more current modification states.

10. The system of claim 9, wherein the UI control enables a user to dynamically toggle a rendering of the subset of multiple objects between the one or more previous modification states and the one or more current modification states.

11. The system of claim 9, wherein the computer-readable instructions further cause the at least one processor to:
receive modification location data that indicates a plurality of locations within the digital document at which individual objects, of the plurality of objects, have been modified; and
responsive to the first user input, determine the subset by analyzing the modification location data with respect to the content section boundary.

12. The system of claim 9, wherein the digital document is a digital canvas document, a word processor document, a spreadsheet document, a computer-aided drafting document, or a slide presentation document.

13. The system of claim 9, wherein the other objects that are not enclosed by the content section boundary are a copied instance of the subset of multiple objects that are enclosed by the content section boundary.

14. A computer-implemented method, comprising:
causing a display device to render a plurality of objects of a digital document;
receiving historical modification data defining modification states in association with individual objects, of the plurality of objects, at a plurality of different times;
receiving a first user input that defines a content section boundary in relation to a coordinate system reference, wherein the content section boundary encloses a subset of the plurality of objects;
determine, based on the first user input, the subset of the plurality of objects that are enclosed within the content section boundary that is defined in relation to the coordinate system reference;
receiving a second user input that selects a selective rollback functionality in association with the content section boundary;
exposing, based at least in part on the second user input, a user input (UI) control in association with the content section boundary;
receiving, via the UI control, a third user input that indicates one or more first modification states, that correspond to a first time, of the subset of the plurality of objects that are enclosed by the content section boundary; and
responsive to the third user input, causing the display device to concurrently render:
the subset of the plurality of objects based on the one or more first modification states that correspond to the first time, and
one or more other objects, that are not enclosed by the content section boundary, based on one or more second modification states that correspond to a second time.

15. The computer-implemented method of claim 14, wherein the first user input includes an audible voice command that indicates one or more properties associated with the subset of the plurality of objects.

16. The computer-implemented method of claim 14, wherein the historical modification data includes at least modification location data that indicates locations within the digital document at which one or more user modifications have occurred.

17. The computer-implemented method of claim 15, wherein the one or more properties associated with the subset of the plurality of objects indicate one or more users that have performed user modifications with respect to the subset of the plurality of objects.

18. The computer-implemented method of claim 14, wherein the third user input includes at least a curser input that is received in association with the user input (UI) control to toggle the subset of the plurality of objects from being rendered in accordance with the one or more second modification states to being rendered in accordance with the one or more first modification states.

19. The system of claim 9, wherein exposing the UI control in association with the content section boundary is responsive to the second user input being received in association with the first user input.

20. The system of claim 9, wherein the content section boundary corresponds to a two-dimensional area of the digital document or a three-dimensional volume of the digital document.

* * * * *